United States Patent
Lin

(10) Patent No.: US 12,302,405 B2
(45) Date of Patent: May 13, 2025

(54) METHOD AND APPARATUS FOR RANDOM ACCESS

(71) Applicant: Telefonaktiebolaget LM Ericsson (publ), Stockholm (SE)

(72) Inventor: Zhipeng Lin, Nanjing Jiangsu (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 357 days.

(21) Appl. No.: 17/792,763

(22) PCT Filed: Jan. 13, 2021

(86) PCT No.: PCT/CN2021/071380
§ 371 (c)(1),
(2) Date: Jul. 14, 2022

(87) PCT Pub. No.: WO2021/143705
PCT Pub. Date: Jul. 22, 2021

(65) Prior Publication Data
US 2023/0056778 A1    Feb. 23, 2023

(30) Foreign Application Priority Data
Jan. 17, 2020    (WO) ................ PCT/CN2020/072845

(51) Int. Cl.
*H04W 74/0833*    (2024.01)
*H04B 7/185*    (2006.01)

(52) U.S. Cl.
CPC .... *H04W 74/0833* (2013.01); *H04B 7/18508* (2013.01)

(58) Field of Classification Search
CPC ............... H04W 56/005; H04W 56/00; H04W 72/1268; H04W 74/0833; H04W 74/0841; H04W 74/0866; H04W 74/08; H04W 72/12; H04W 4/06; H04W 76/40; G01S 13/003; G01S 13/765; G01S 13/767; G01S 13/87; G01S 13/00; G01S 13/76; G01S 5/02; H04L 43/0864; H04L 1/0003; H04L 1/0009; H04L 1/0026; H04L 1/1816; H04L 1/1822; H04L 1/1861; H04L 12/1868;
(Continued)

(56) References Cited

U.S. PATENT DOCUMENTS

| | | | |
|---|---|---|---|
| 11,558,891 B2 * | 1/2023 | Jeon | H04W 52/50 |
| 2020/0267763 A1 * | 8/2020 | Deogun | H04L 5/0048 |
| 2021/0329711 A1 * | 10/2021 | Gu | H04W 74/0841 |

(Continued)

OTHER PUBLICATIONS

International Search Report and Written Opinion of the International Searching Authority, PCT/CN2021/071380, mailed Apr. 22, 2021, 13 pages.
(Continued)

*Primary Examiner* — Nathan S Taylor
(74) *Attorney, Agent, or Firm* — Sage Patent Group

(57) ABSTRACT

Various embodiments of the present disclosure provide a method for random access. The method which may be performed by a terminal device includes determining a random access occasion based at least in part on random access configuration information for a non-terrestrial network. The method further includes transmitting a preamble to a network node in the non-terrestrial network, according to the determined random access occasion.

18 Claims, 21 Drawing Sheets

(58) Field of Classification Search
CPC . H04L 2001/0093; H04L 5/0055; H04L 1/18; H04L 5/00
See application file for complete search history.

(56) References Cited

U.S. PATENT DOCUMENTS

| | | | | |
|---|---|---|---|---|
| 2022/0201770 A1* | 6/2022 | Xu | ..................... | H04B 7/18513 |
| 2022/0225259 A1* | 7/2022 | Wang | .................. | H04W 56/009 |
| 2022/0225424 A1* | 7/2022 | Wang | .................. | H04L 43/0864 |
| 2022/0248286 A1* | 8/2022 | Sedin | .................. | H04W 36/362 |
| 2022/0264636 A1* | 8/2022 | Wang | .................. | H04W 74/002 |
| 2022/0346138 A1* | 10/2022 | Wang | .................. | H04W 74/006 |

OTHER PUBLICATIONS

Thales, "Reporting About NTN SI," 3GPP TSG-RAN WG3 Meeting # 106 R2-197003, Reno, USA, Nov. 18-22, 2019 (XP051827690) 6 pages.

Thales, "Presentation of Report to TSG-RAN of TR38.821, Version 1.1.0," 3GPP TSG-RAN Meeting #86 Tdoc RP-193062, Sitges, Spain, Dec. 9-12, 2019 (XP051838792) 1 pages.

Huawei, HiSilicon, "Random access without location information," 3GPP TSG-RAN WG2 Meeting 107Bis, R2-1913784 Chongqing, China, Oct. 14-18, 2019, Update of R2-1911233 (XP051805248) 5 pages.

Thales, "Solutions for NR to support non-terrestrial networks (NTN)," 3GPP TSG RAN meeting #86 RP-193234, Sitges, Spain, Dec. 9-13, 2019 revision from RP-192502, 3144, 10 pages.

"Time Budget Request WID-NR-NN Solution V. 4," Data Table Corresponding to RP-193234, Dec. 9-13, 2019, 6 pages.

* cited by examiner

METHOD AND APPARATUS FOR RANDOM ACCESS

CROSS REFERENCE TO RELATED APPLICATIONS

This application is a 35 U.S.C. § 371 national stage application of PCT International Application No. PCT/CN2021/071380 filed on Jan. 13, 2021, which in turn claims foreign priority to International Patent Application No. PCT/CN2020/072845, filed on Jan. 17, 2020, the disclosures and content of which are incorporated by reference herein in their entirety.

FIELD OF THE INVENTION

The present disclosure generally relates to communication networks, and more specifically, to a method and apparatus for random access.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long-term evolution (LTE) and new radio (NR) networks are expected to achieve high traffic capacity and end-user data rate with lower latency. In order to connect to a network node, a random access (RA) procedure may be initiated for a terminal device. In the RA procedure, system information (SI) and synchronization signals (SS) as well as the related radio resource and transmission configuration can be informed to the terminal device by signaling messages from the network node. The RA procedure can enable the terminal device to establish a session for a specific service with the network node.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A communication system such as NR system may be configured to support various networks such as terrestrial networks (TN) and non-terrestrial networks (NTN). An NTN may refer to a network, or segment of networks using radio frequency (RF) resources on board a satellite or an unmanned aircraft system (UAS) platform. A TN may refer to a ground based network in which the round trip time is much shorter than that in the NTN. Different signaling approaches (e.g., a four-step approach, a two-step approach, etc.) may be used for a RA procedure of a terminal device to set up a connection with a network node. In the RA procedure, the terminal device may perform a RA preamble transmission and a physical uplink shared channel (PUSCH) transmission to the network node. The RA preamble may be transmitted in a time-frequency physical random access channel (PRACH) occasion (which is also known as a RA occasion, RACH occasion, or RO for short). The PUSCH transmission may occur in a PUSCH occasion (PO) configured with one or more demodulation reference signal (DMRS) resources. The network node may detect the RA preamble within a preamble receiving window. In response to detection of the RA preamble, the network node may need to determine which RO the RA preamble is related to, so as to estimate the accurate timing advance. For a network such as NTN, two consecutive preamble receiving windows associated with the corresponding ROs may overlap each other due to long propagation delay. In this case, the network node may receive a preamble within the overlapping part and thus may not be able to determine the RO related to the received RA preamble. Therefore, it may be desirable to improve RO design and/or detection for a communication network such as NTN.

Various embodiments of the present disclosure propose a solution for RA, which can enable a network node in a communication network (e.g., an NTN, etc.) to link a preamble received from a terminal device to the corresponding RO, for example, by introducing a proper RO design without overlapping between preamble receiving windows, and/or by providing specific RO timing information to the network node, so as to increase flexibility of RO configuration and/or detection, and improve performance of a RA procedure for the communication network.

It can be realized that the terms "PRACH occasion", "random access channel (RACH) occasion" or "RA occasion" mentioned herein may refer to a time-frequency resource usable for the preamble transmission in a RA procedure, which may also be referred to as "random access occasion (RO)". These terms may be used interchangeably in this document.

Similarly, it can be realized that the terms "PUSCH occasion", "uplink shared channel occasion" or "shared channel occasion" mentioned herein may refer to a time-frequency resource usable for PUSCH transmission in a RA procedure, which may also be referred to as "physical uplink shared channel occasion (PO)". These terms may be used interchangeably in this document.

According to a first aspect of the present disclosure, there is provided a method performed by a terminal device such as a user equipment (UE). The method comprises determining a RO based at least in part on RA configuration information for an NTN. The method further comprises transmitting a preamble to a network node in the NTN, according to the determined RO.

In accordance with some exemplary embodiments, the RA configuration information may indicate configuration of two consecutive ROs so that a time interval between the two consecutive ROs may be equal to or larger than an interval threshold. According to an embodiment, the interval threshold may be determined based at least in part on a maximum one way delay and a minimum one way delay of signal transmission in the NTN.

In accordance with some exemplary embodiments, the RA configuration information may indicate configuration of two consecutive ROs so that two preamble receiving windows associated with the two consecutive ROs are not overlapped.

In accordance with some exemplary embodiments, the RA configuration information may indicate a first set of ROs configured for the NTN in a predetermined time duration. The first set of ROs may be a subset of a second set of ROs configured for a TN in the predetermined time duration.

In accordance with some exemplary embodiments, the RA configuration information may comprise a first bit map mask to indicate one or more subframes within one or more system frames. The first set of ROs for the NTN may be configured on the one or more subframes.

In accordance with some exemplary embodiments, the RA configuration information may comprise a second bit map mask to invalidate one or more of a second set of ROs configured for a TN in a predetermined time duration, so that only a subset of the second set of ROs in the predetermined time duration are valid for the NTN.

In accordance with some exemplary embodiments, the RA configuration information may indicate a RA configuration period. The length of the RA configuration period may meet a specific criterion for the NTN.

In accordance with some exemplary embodiments, the RA configuration information may comprise an offset to a RA configuration period for a TN to indicate the RA configuration period for the NTN.

In accordance with some exemplary embodiments, the RA configuration information may be received from the network node by the terminal device.

In accordance with some exemplary embodiments, the RA configuration information may be predetermined for the NTN separately from a TN.

In accordance with some exemplary embodiments, the RA configuration information may comprise: a RA configuration period for the NTN in number of system frames, and/or an indicator of a subframe on which a RO for the NTN may be configured.

In accordance with some exemplary embodiments, the RA configuration information may be applicable to a four-step RA procedure and/or a two-step RA procedure.

According to a second aspect of the present disclosure, there is provided an apparatus which may be implemented as a terminal device. The apparatus comprises one or more processors and one or more memories comprising computer program codes. The one or more memories and the computer program codes are configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a terminal device. The apparatus comprises a determining unit and a transmitting unit. In accordance with some exemplary embodiments, the determining unit is operable to carry out at least the determining step of the method according to the first aspect of the present disclosure. The transmitting unit is operable to carry out at least the transmitting step of the method according to the first aspect of the present disclosure.

According to a fifth aspect of the present disclosure, there is provided a method performed by a network node such as a base station (e.g., a next generation NodeB (gNodeB or gNB), a satellite, an unmanned aircraft system (UAS) platform, etc.). The method comprises determining a preamble receiving window based at least in part on RA configuration information for an NTN. The method further comprises receiving, within the preamble receiving window, a preamble transmitted from a terminal device in the NTN.

In accordance with some exemplary embodiments, the RA configuration information for the NTN according to the fifth aspect of the present disclosure may correspond to the RA configuration information for the NTN according to the first aspect of the present disclosure. Thus, the RA configuration information for the NTN according to the first and fifth aspects of the present disclosure may have the same or similar contents and/or feature elements.

In accordance with some exemplary embodiments, the RA configuration information may be transmitted to the terminal device by the network node.

According to a sixth aspect of the present disclosure, there is provided an apparatus which may be implemented as a network node. The apparatus comprises one or more processors and one or more memories comprising computer program codes. The one or more memories and the computer program codes are configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a network node. The apparatus comprises a determining unit and a receiving unit. In accordance with some exemplary embodiments, the determining unit is operable to carry out at least the determining step of the method according to the fifth aspect of the present disclosure. The receiving unit is operable to carry out at least the receiving step of the method according to the fifth aspect of the present disclosure.

According to a ninth aspect of the present disclosure, there is provided a method performed by a terminal device such as a UE. The method comprises determining timing information of a RO for an NTN. The method further comprises transmitting a request message for RA to a network node in the NTN, based at least in part on the timing information. As an example, the request message for RA may be message A for a two-step RA procedure. In an embodiment, the transmission of the request message may comprise a preamble transmission in the RO and a shared channel transmission in a shared channel occasion (e.g., PUSCH transmission in a PO). The timing information may be indicated by the shared channel transmission.

In accordance with some exemplary embodiments, the timing information of the RO may comprise at least one of:
an indicator of a system frame;
an indicator of a subframe within a system frame;
an indicator of a RO within a subframe; and
an indicator of a random access channel slot in a system frame.

In accordance with some exemplary embodiments, the indicator of the system frame may comprise a bit sequence. The length of the bit sequence may be based at least in part on a size of a random access response (RAR) window for the NTN.

In accordance with some exemplary embodiments, the indication of the timing information by the shared channel transmission may comprise at least one of:
including the timing information as a part of data information carried in the shared channel transmission;
multiplexing the timing information with the data information carried in the shared channel transmission;

generating a scrambling sequence for the shared channel transmission based at least in part on the timing information; and using an association between the RO and the shared channel occasion (e.g., PO) to indicate the timing information.

According to a tenth aspect of the present disclosure, there is provided an apparatus which may be implemented as a terminal device. The apparatus comprises one or more processors and one or more memories comprising computer program codes. The one or more memories and the computer program codes are configured to, with the one or more processors, cause the apparatus at least to perform any step of the method according to the ninth aspect of the present disclosure.

According to an eleventh aspect of the present disclosure, there is provided a computer-readable medium having computer program codes embodied thereon which, when executed on a computer, cause the computer to perform any step of the method according to the ninth aspect of the present disclosure.

According to a twelfth aspect of the present disclosure, there is provided an apparatus which may be implemented as a terminal device. The apparatus comprises a determining unit and a transmitting unit. In accordance with some exemplary embodiments, the determining unit is operable to carry out at least the determining step of the method according to the ninth aspect of the present disclosure. The transmitting unit is operable to carry out at least the transmitting step of the method according to the ninth aspect of the present disclosure.

According to a thirteenth aspect of the present disclosure, there is provided a method performed by a network node such as a base station (e.g., a gNB, a satellite, a UAS platform, etc.). The method comprises receiving a request message for RA (e.g. msgA for two-step RA, etc.) transmitted from a terminal device in an NTN. The transmission of the request message may comprise a preamble transmission in a RO and a shared channel transmission in a shared channel occasion (e.g., PUSCH transmission in a PO). The method further comprises determining timing information of the RO, according to the received shared channel transmission.

In accordance with some exemplary embodiments, the timing information of the RO according to the thirteenth aspect of the present disclosure may correspond to the timing information of the RO according to the ninth aspect of the present disclosure. Thus, the timing information of the RO according to the ninth and thirteenth aspects of the present disclosure may have the same or similar contents and/or feature elements.

In accordance with some exemplary embodiments, the determination of the timing information of the RO by the network node may comprise at least one of:

determining the timing information which may be included as a part of data information carried in the shared channel transmission;

determining the timing information which may be multiplexed with the data information carried in the shared channel transmission;

determining the timing information according to a scrambling sequence for the shared channel transmission which may be generated based at least in part on the timing information; and determining the timing information by using an association between the RO and the shared channel occasion such as PO.

In accordance with some exemplary embodiments, the method according to the thirteenth aspect of the present disclosure may further comprise: obtaining timing advance according to the timing information.

In accordance with some exemplary embodiments, the method according to the thirteenth aspect of the present disclosure may further comprise: transmitting a response to the request message for RA to the terminal device according to the timing information.

According to a fourteenth aspect of the present disclosure, there is provided an apparatus which may be implemented as a network node. The apparatus comprises one or more processors and one or more memories comprising computer program codes. The one or more memories and the computer program codes are configured to, with the one or more processors, cause the apparatus at least to perform any step of the method according to the thirteenth aspect of the present disclosure.

According to a fifteenth aspect of the present disclosure, there is provided a computer-readable medium having computer program codes embodied thereon which, when executed on a computer, cause the computer to perform any step of the method according to the thirteenth aspect of the present disclosure.

According to a sixteenth aspect of the present disclosure, there is provided an apparatus which may be implemented as a network node. The apparatus comprises a receiving unit and a determining unit. In accordance with some exemplary embodiments, the receiving unit is operable to carry out at least the receiving step of the method according to the thirteenth aspect of the present disclosure. The determining unit is operable to carry out at least the determining step of the method according to the thirteenth aspect of the present disclosure.

According to a seventeenth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to the fifth or thirteenth aspect of the present disclosure.

According to an eighteenth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the fifth or thirteenth aspect of the present disclosure.

According to a nineteenth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the first or ninth aspect of the present disclosure.

According to a twentieth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the first or ninth aspect of the present disclosure.

According to a twenty-first aspect of the present disclosure, there is provided a method implemented in a communication system which may include a host computer, a base station and a UE. The method may comprise, at the host computer, receiving user data transmitted to the base station from the UE which may perform any step of the method according to the first or ninth aspect of the present disclosure.

According to a twenty-second aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the first or ninth aspect of the present disclosure.

According to a twenty-third aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the fifth or thirteenth aspect of the present disclosure.

According to a twenty-fourth aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the fifth or thirteenth aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1A:
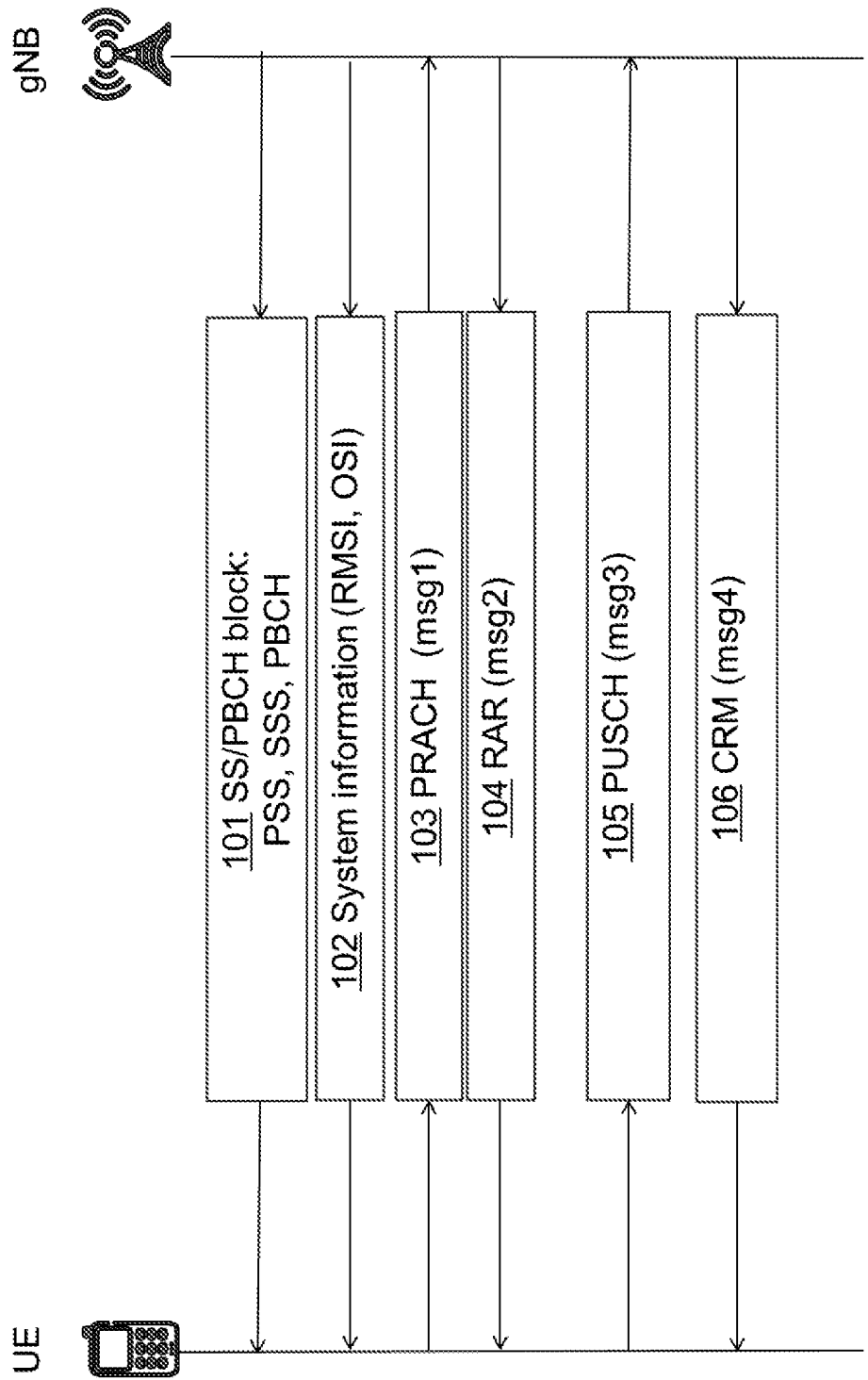
FIG. 1A is a diagram illustrating an exemplary four-step RA procedure according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

According to various exemplary embodiments, the communication network may comprise a non-terrestrial network (NTN) or other suitable types of networks supported by any appropriate communication protocol.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

According to various exemplary embodiments, the network node may comprise a satellite, an unmanned aircraft system (UAS) platform or other suitable types of network devices deployed in a communication network such as NTN. It can be appreciated that the network node such as gNB in various exemplary embodiments according to the present disclosure may be implemented as or configured at a satellite or UAS platform.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. As described previously, in order to connect to a network node such as a gNB in a wireless communication network, a terminal device such as a UE may need to perform a RA procedure to exchange essential information and messages for communication link establishment with the network node.

FIG. 1A is a diagram illustrating an exemplary four-step RA procedure according to an embodiment of the present disclosure. As shown in FIG. 1A, a UE can detect a synchronization signal (SS) by receiving 101 an SSB (e.g., a primary synchronization signal (PSS), a secondary synchronization signal (SSS), and physical broadcast channel (PBCH)) from a gNB in a NR system. The UE can decode 102 some system information (e.g., remaining minimum system information (RMSI) and other system information (OSI)) broadcasted in the downlink (DL). Then the UE can transmit 103 a PRACH preamble (message1/msg1) in the uplink (UL). The gNB can reply 104 with a random access response (RAR, message2/msg2). In response to the RAR, the UE can transmit 105 the UE's identification information (message3/msg3) on PUSCH. Then the gNB can send 106 a contention resolution message (CRM, message4/msg4) to the UE.

In this exemplary procedure, the UE transmits message3/msg3 on PUSCH after receiving a timing advance command in the RAR, allowing message3/msg3 on PUSCH to be received with timing accuracy within a cyclic prefix (CP). Without this timing advance, a very large CP may be needed in order to be able to demodulate and detect message3/msg3 on PUSCH, unless the communication system is applied in a cell with very small distance between the UE and the gNB. Since the NR system can also support larger cells with a need for providing a timing advance command to the UE, the four-step approach is needed for the RA procedure.

In the NR system, the time and frequency resource on which a PRACH preamble is transmitted may be defined as a PRACH occasion. Different PRACH configuration schemes may be specified for frequency range 1 (FR1) paired spectrum, FR1 unpaired spectrum and frequency range 2 (FR2) with unpaired spectrum, respectively. The specified PRACH configuration may be maintained in a PRACH configuration table. The time resource and preamble format for PRACH transmission may be configured by a PRACH configuration index, which indicates a row in a PRACH configuration table. For example, at least part of PRACH configuration for preamble format 0 for FR1 unpaired spectrum is shown in Table 1.

In Table 1, the value of x indicates the PRACH configuration period in number of system frames, and the value of y indicates the system frame within each PRACH configuration period on which the PRACH occasions are configured. For instance, if y is set to 0, then it means that PRACH occasions are only configured in the first frame of each PRACH configuration period. The value in the column "Subframe number" tells which subframes are configured with PRACH occasions. The value in the column "Starting symbol" is the symbol index. Determination of time resources for PRACH transmission for FR2 is similar, except that 60 kHz slots are used instead of subframes.

In the case of time division duplexing (TDD), semi-statically configured DL parts and/or actually transmitted SSBs can override and invalidate some time-domain PRACH occasions defined in the PRACH configuration table. More specifically, PRACH occasions in the UL part are always valid, and a PRACH occasion within a certain part (e.g., a part with flexible symbols within a NR slot) is valid as long as it does not precede or collide with an SSB in the RACH slot and there are at least N symbols after the DL part and the last symbol of an SSB. For example, N may be set as 0 or 2, depending on the PRACH format and subcarrier spacing.

The PRACH occasion configuration may be performed according to some information element. An exemplary RACH-ConfigGeneric information element is shown as below.

TABLE 1

| PRACH Configuration Index | Preamble format | $n_{SFN}$ mod x = y | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 | 0 | — | — | 0 |
| 1 | 0 | 8 | 1 | 9 | 0 | — | — | 0 |
| 2 | 0 | 4 | 1 | 9 | 0 | — | — | 0 |
| 3 | 0 | 2 | 0 | 9 | 0 | — | — | 0 |
| 4 | 0 | 2 | 1 | 9 | 0 | — | — | 0 |
| 5 | 0 | 2 | 0 | 4 | 0 | — | — | 0 |
| 6 | 0 | 2 | 1 | 4 | 0 | — | — | 0 |
| 7 | 0 | 1 | 0 | 9 | 0 | — | — | 0 |
| 8 | 0 | 1 | 0 | 8 | 0 | — | — | 0 |
| 9 | 0 | 1 | 0 | 7 | 0 | — | — | 0 |
| 10 | 0 | 1 | 0 | 6 | 0 | — | — | 0 |
| 11 | 0 | 1 | 0 | 5 | 0 | — | — | 0 |
| 12 | 0 | 1 | 0 | 4 | 0 | — | — | 0 |
| 13 | 0 | 1 | 0 | 3 | 0 | — | — | 0 |
| 14 | 0 | 1 | 0 | 2 | 0 | — | — | 0 |
| 15 | 0 | 1 | 0 | 1, 6 | 0 | | — | 0 |
| 16 | 0 | 1 | 0 | 1, 6 | 7 | — | — | 0 |
| 17 | 0 | 1 | 0 | 4, 9 | 0 | — | — | 0 |
| 18 | 0 | 1 | 0 | 3, 8 | 0 | — | — | 0 |
| 19 | 0 | 1 | 0 | 2, 7 | 0 | — | — | 0 |
| 20 | 0 | 1 | 0 | 8, 9 | 0 | — | — | 0 |
| 21 | 0 | 1 | 0 | 4, 8, 9 | 0 | — | — | 0 |
| 22 | 0 | 1 | 0 | 3, 4, 9 | 0 | — | — | 0 |
| 23 | 0 | 1 | 0 | 7, 8, 9 | 0 | — | — | 0 |
| 24 | 0 | 1 | 0 | 3, 4, 8, 9 | 0 | — | — | 0 |
| 25 | 0 | 1 | 0 | 6, 7, 8, 9 | 0 | — | — | 0 |
| 26 | 0 | 1 | 0 | 1, 4, 6, 9 | 0 | — | — | 0 |
| 27 | 0 | 1 | 0 | 1, 3, 5, 7, 9 | 0 | — | — | 0 |

| RACH-ConfigGeneric information element |
|---|
| -- ASN1START<br>-- TAG-RACH-CONFIG-GENERIC-START<br>RACH-ConfigGeneric ::=                SEQUENCE {<br>  prach-Configurationindex            INTEGER (0..255),<br>  msg1-FDM                            ENUMERATED {one, two, four, eight},<br>  msg1-Frequencystart                 INTEGER(0..maxNrofPhysicalResourceBlocks-1),<br>  zeroCorrelationZoneConfig           INTEGER(0..15),<br>  preambleReceivedTargetPower         INTEGER (-202..-60),<br>  preambleTransMax                    ENUMERATED {n3, n4, n5, n6, n7, n8, n10, n20,<br>n50, n100, n200},<br>    powerRampingStep                  ENUMERATED {dB0, dB2, dB4, dB6},<br>    ra-Responsewindow                 ENUMERATED {sl1, s12, s14, s18, s110, s120,<br>s140, s180},<br>  ...<br>}<br>-- TAG-RACH-CONFIG-GENERIC-STOP<br>-- ASN1STOP |

As defined in 3GPP technical specification (TS) 38.331 V15.8.0, where the entire content of this technical specification is incorporated into the present disclosure by reference, the higher-layer parameter msg1-FDM indicates the number of PRACH transmission occasions frequency-division multiplexed (FDMed) in one time instance, and the higher-layer parameter msg1-FrequencyStart indicates an offset of lowest PRACH transmission occasion in frequency domain with respective to physical resource block 0 (PRB 0). The value may be configured so that the corresponding RACH resource is entirely within the bandwidth of the UL bandwidth part (BWP).

In the frequency domain, a NR system may support multiple frequency-multiplexed PRACH occasions on the same time-domain PRACH occasion. This is mainly motivated by the support of analog beam sweeping in the NR system such that the PRACH occasions associated to one SSB are configured at the same time instance but different frequency locations. Random access preambles can only be transmitted in the frequency resources given by the higher-layer parameter msg1-FrequencyStart. The PRACH frequency resources $n_{RA} \in \{0, 1, \ldots, M_{RA}-1\}$, where $M_{RA}$ equals the higher-layer parameter msg1-FDM, are numbered in increasing order within the initial active UL bandwidth part during initial access, starting from the lowest frequency. Otherwise, $n_{RA}$ are numbered in increasing order within the active UL bandwidth part, starting from the lowest frequency.

Figure 1B:
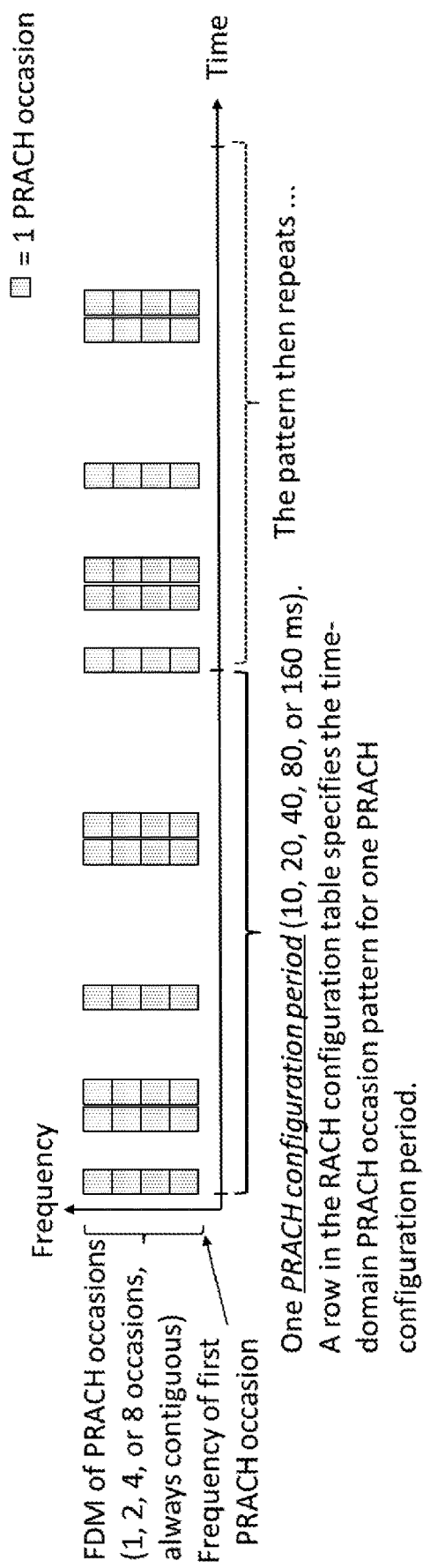
FIG. 1B is a diagram illustrating an exemplary PRACH configuration according to an embodiment of the present disclosure.

FIG. 1B is a diagram illustrating an exemplary PRACH configuration according to an embodiment of the present disclosure. As shown in FIG. 1B, the number of PRACH occasions FDMed in one time domain PRACH occasion may be 1, 2, 4, or 8, and the PRACH configuration period may be 10 ms, 20 ms, 40 ms, 80 ms or 160 ms. As mentioned previously, a row in a PRACH/RACH configuration table can specify the time-domain PRACH occasion pattern for one PRACH configuration period.

In accordance with an exemplary embodiment, there may be up to 64 sequences that can be used as RA preambles per PRACH occasion in each cell. The radio resource control (RRC) parameter such as totalNumberOfRA-Preambles can be used to determine how many of these 64 sequences are used as RA preambles per PRACH occasion in each cell. The 64 sequences may be configured by including firstly all the available cyclic shifts of a root Zadoff-Chu sequence, and secondly in the order of increasing root index, until 64 preambles have been generated for the PRACH occasion.

According to some exemplary embodiments, there may be an association between an SSB and a PRACH occasion. For example, one-to-one association between an SSB and a PRACH occasion (e.g., one SSB per PRACH occasion) may be supported in the NR system. Similarly, one-to-many and/or many-to-one association between SSB(s) and PRACH occasion(s) may also be supported in the NR system.

Figure 1C:
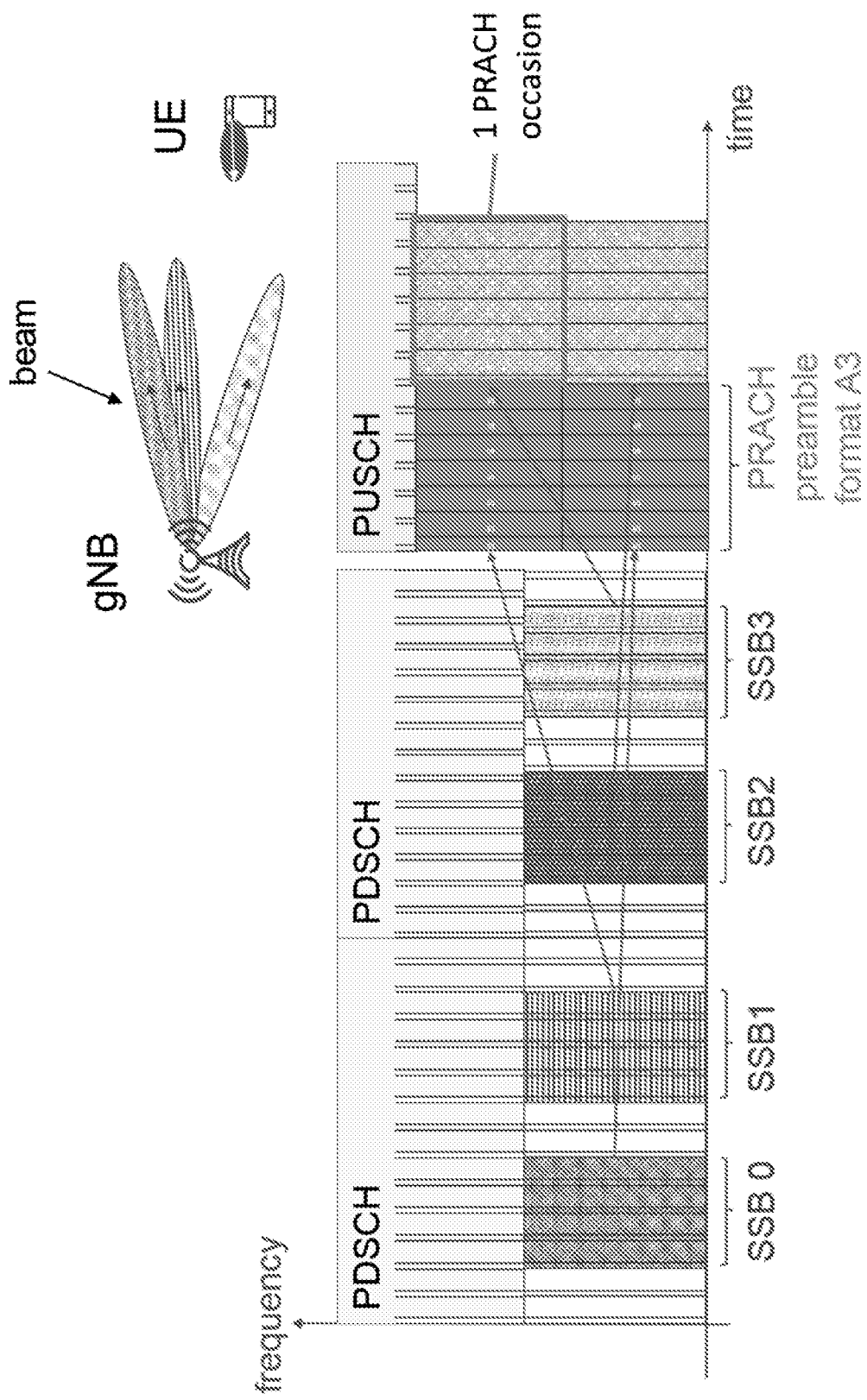
FIGS. 1C-1D are diagrams illustrating examples of an association between a synchronization signal and physical broadcast channel block (which is also known as an SS/PBCH block or SSB for short) and a PRACH occasion according to some embodiments of the present disclosure.
Figure 1D:
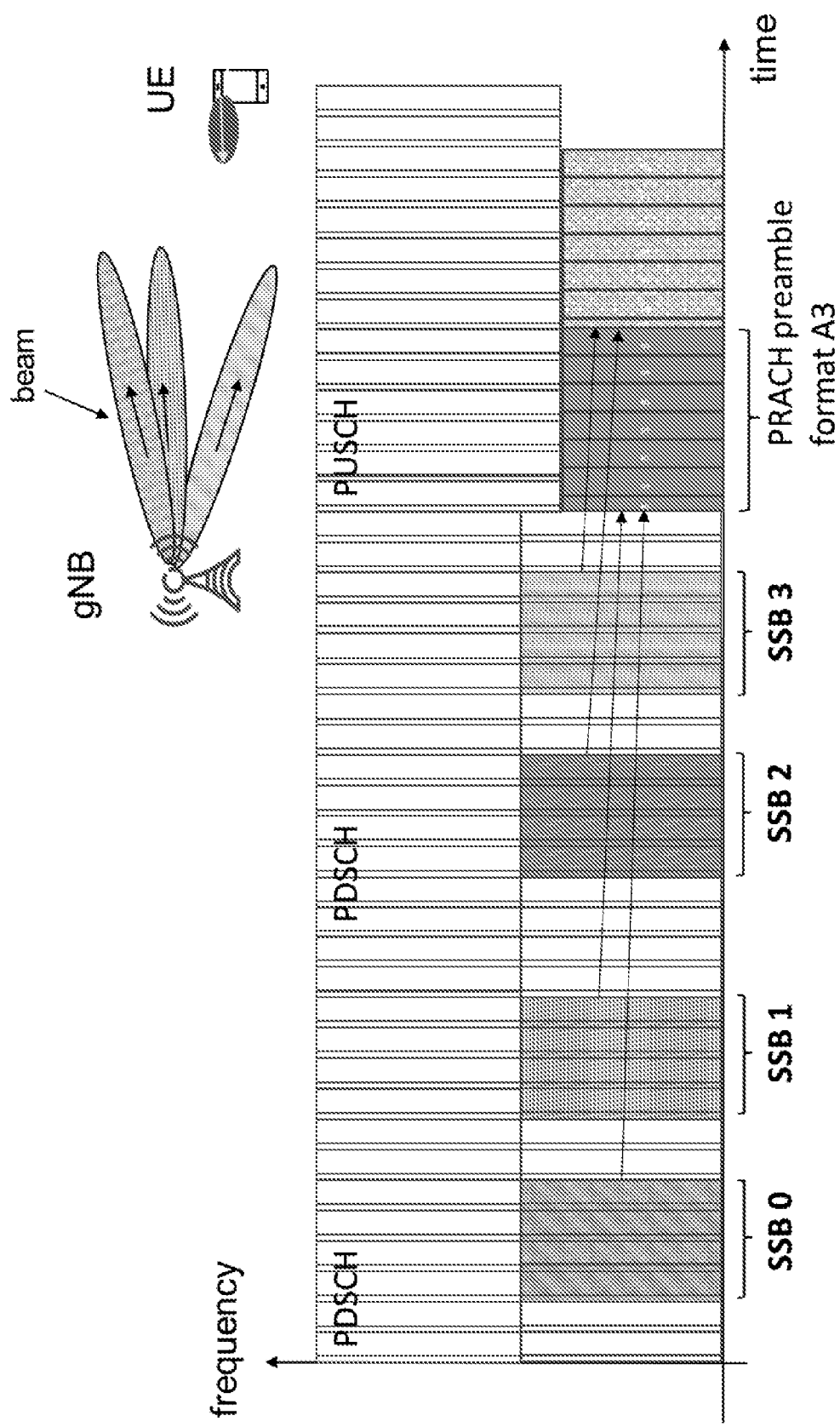

FIGS. 1C-1D are diagrams illustrating examples of an association between an SSB and a PRACH occasion according to some embodiments of the present disclosure. In the example of one SSB per PRACH occasion as shown in FIG. 1C, SSB0, SSB1, SSB2 and SSB3 are associated with four different PRACH occasions, respectively. In the example of two SSBs per PRACH occasion as shown in FIG. 1D, SSB0 and SSB1 are associated with a PRACH occasion, and SSB2 and SSB3 are associated with another PRACH occasion. It can be appreciated that the association between an SSB and a PRACH occasion as shown in FIG. 1C or FIG. 1D is just an example, and other suitable association between an SSB and a PRACH occasion with a proper PRACH preamble format may also be implemented.

In accordance with an exemplary embodiment, a gNB can use different transmission beams to transmit the respective SSBs to a UE. In response to reception of the SSBs from the gNB, the UE can send PRACH preambles to the gNB in an associated PRACH occasion. According to the association between an SSB and a PRACH occasion and the mapping from an SSB to a transmission beam, the gNB can use the PRACH preambles received from the UE to determine its transmission beam preferred by the UE. The gNB can use the determined transmission beam in the DL transmission and optionally in the UL reception.

In accordance with some exemplary embodiments, the preambles associated to each SSB may be configured by two RRC parameters ssb-perRACH-OccasionAndCB-PreamblesPerSSB and totalNumberOfRA-Preambles, which may be indicated by an information element (IE) such as RACH-ConfigCommon in a system information block (e.g., SIB1). A specific rule may be defined for mapping an SSB to RA preambles. For example, a UE may be provided with a number N of SSBs associated to one PRACH occasion and a number R of contention-based (CB) preambles per SSB per valid PRACH occasion by parameter ssb-perRACH-OccasionAndCB-PreamblesPerSSB. If N<1, one SSB is mapped to 1/N consecutive valid PRACH occasions and R contention-based preambles with consecutive indexes associated with the SSB per valid PRACH occasion start from preamble index 0. If N≥1, R contention-based preambles with consecutive indexes associated with SSB n, 0≤n≤N−1, per valid PRACH occasion start from preamble index $n \cdot N_{preamble}^{total}/N$, where $N_{preamble}^{total}$ is provided by parameter totalNumberOfRA-Preambles and is an integer multiple of N.

In accordance with some exemplary embodiments, SSB indexes provided by an IE such as ssb-PositionsInBurst in SIB1 or in ServingCellConfigCommon (e.g., as described in 3GPP TS 38.211 V16.0.0, where the entire content of this technical specification is incorporated into the present disclosure by reference) may be mapped to valid PRACH occasions in the following order:

First, in increasing order of preamble indexes within a single PRACH occasion;
Second, in increasing order of frequency resource indexes for frequency multiplexed PRACH occasions;
Third, in increasing order of time resource indexes for time multiplexed PRACH occasions within a PRACH slot; and
Fourth, in increasing order of indexes for PRACH slots.

An association period, starting from frame 0, for mapping SSBs to PRACH occasions is the smallest value in the set determined by the PRACH configuration period according to certain PRACH configuration such that $N_{Tx}^{SSB}$ SSBs are mapped at least once to the PRACH occasions within the association period, where a UE obtains $N_{Tx}^{SSB}$ from the value of ssb-PositionsInBurst in SIB1 or in ServingCellConfigCommon. If after an integer number of SSBs to PRACH occasions mapping cycles within the association period there is a set of PRACH occasions that are not mapped to $N_{Tx}^{SSB}$ SSBs, no SSBs are mapped to the set of PRACH occasions. An association pattern period may include one or more association periods and can be determined so that a pattern between PRACH occasions and SSBs repeats at most every 160 ms. PRACH occasions not associated with SSBs after an integer number of association periods, if any, are not used for PRACH transmissions.

Figure 1E:
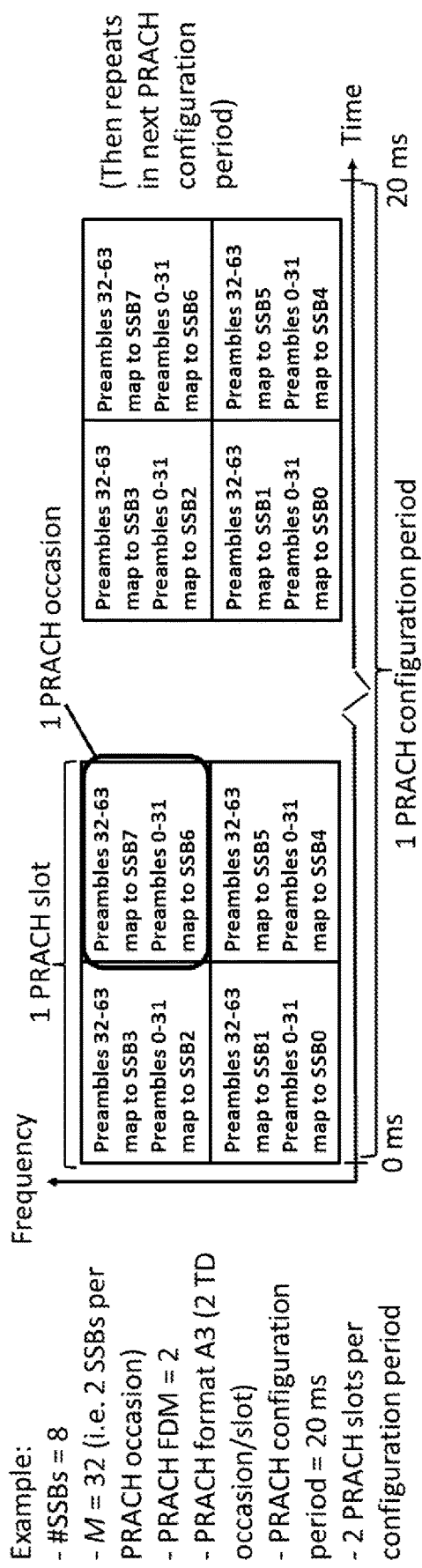
FIG. 1E is a diagram illustrating an example of mapping between an SSB and RA preambles according to an embodiment of the present disclosure.

FIG. 1E is a diagram illustrating an example of mapping between an SSB and RA preambles according to an embodiment of the present disclosure. In this example, the number of PRACH slots in one PRACH configuration period is 2, the number of PRACH occasions in one PRACH slot is 4, and the number of SSBs in one PRACH occasion is 2. As shown in FIG. 1E, the mapping between an SSB and PRACH preambles may be done by consecutively associating M preambles to each SSB, where $M=N_{preamble}^{total}$ For instance, the preambles can be taken as follows:

First, in increasing order of preamble indexes within a single PRACH occasion;
Second, in increasing order of frequency resource indexes for frequency multiplexed PRACH occasions; and
Third, in increasing order of time.

Figure 1F:
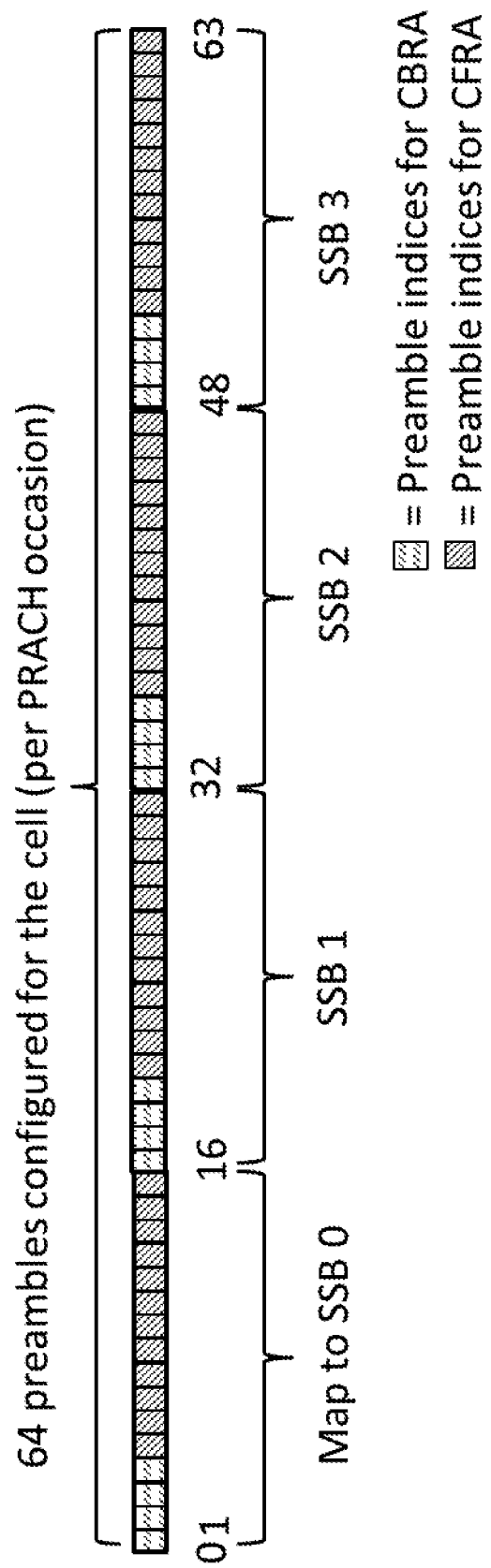
FIG. 1F is a diagram illustrating exemplary preambles per SSB per PRACH occasion according to an embodiment of the present disclosure.

FIG. 1F is a diagram illustrating exemplary preambles per SSB per PRACH occasion according to an embodiment of the present disclosure. In this embodiment, for each SSB, the associated preambles per PRACH occasion are further divided into two sets for contention-based random access (CBRA) and contention free random access (CFRA). The number of contention-based (CB) preambles per SSB per PRACH occasion may be signaled by an RRC parameter such as CB-preambles-per-SSB. Preamble indices for CBRA and CFRA are mapped consecutively for one SSB in one PRACH occasion, as shown in FIG. 1F.

Figure 2:
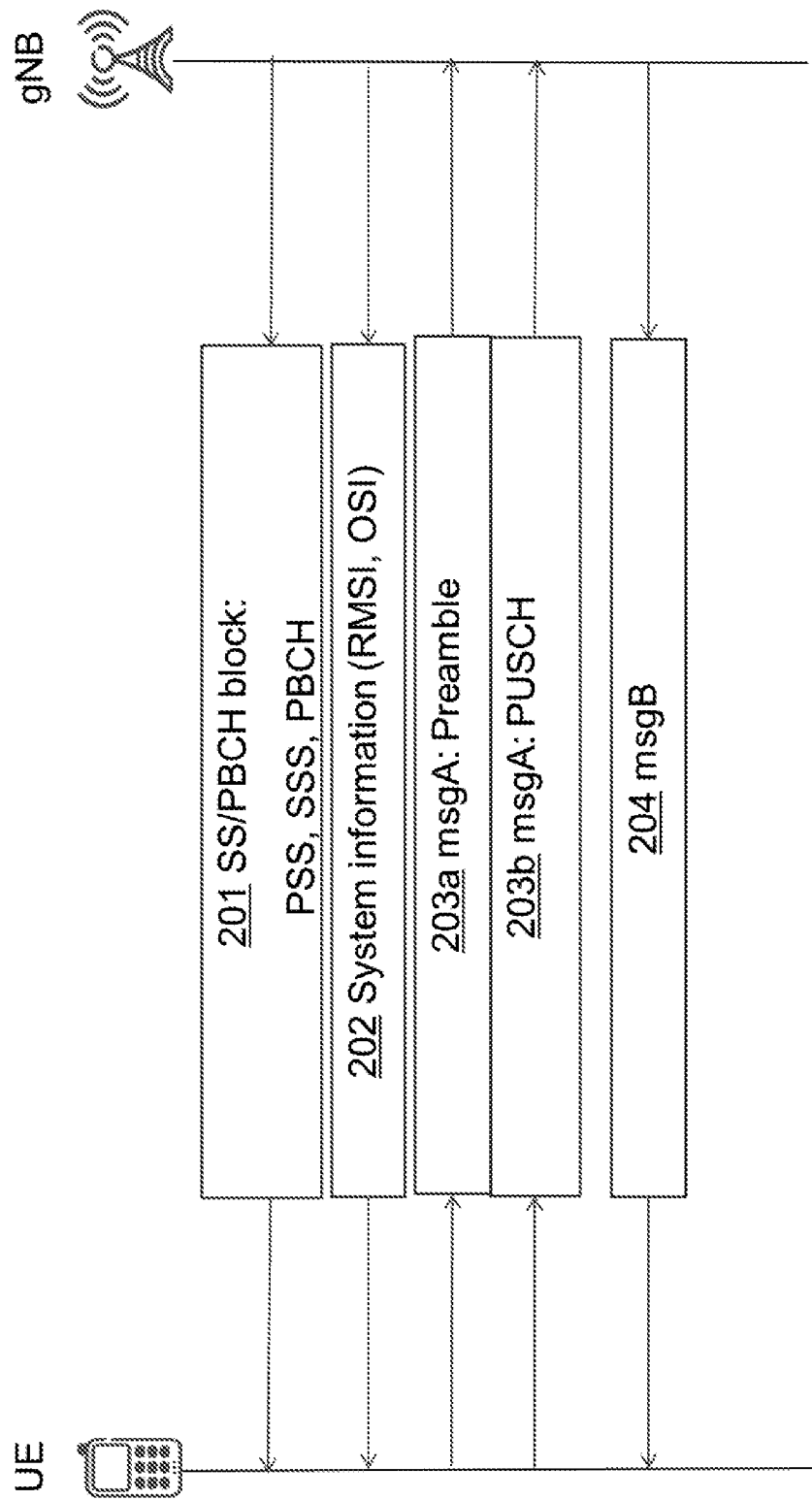
FIG. 2 is a diagram illustrating an exemplary two-step RA procedure according to an embodiment of the present disclosure.

FIG. 2 is a diagram illustrating an exemplary two-step RA procedure according to an embodiment of the present disclosure. Similar to the procedure as shown in FIG. 1A, in the procedure shown in FIG. 2, a UE can detect a SS by receiving 201 an SSB (e.g., comprising a PSS, a SSS and PBCH) from a gNB in a NR system, and decode 202 system information (e.g., remaining minimum system information (RMSI) and other system information (OSI)) broadcasted in the DL. Compared to the four-step approach as shown in FIG. 1A, the UE performing the procedure in FIG. 2 can complete random access in only two steps. Firstly, the UE sends 203a/203b to the gNB a message A (msgA) including RA preamble together with higher layer data such as an RRC connection request possibly with some payload on PUSCH. Secondly, the gNB sends 204 to the UE a RAR (also called message B or msgB) including UE identifier assignment, timing advance information, a contention resolution message, and etc. It can be seen that there may be no explicit grant from msgB for PUSCH in msgA as the msgB is after msgA.

In the two-step RA procedure, the preamble and msgA PUSCH can be transmitted by the UE in one message called message A. Separate PRACH resources (defined by ROs and preamble sequences) can be configured for the two-step RA procedure and the four-step RA procedure so that the network can distinguish the UEs performing the four-step RA procedure from the UEs performing the two-step RA procedure.

Considering the relation of PRACH resources between two-step RA and four-step RA, the network may have the flexibility to perform PRACH configuration according to the following options:

Option I: separate ROs for two-step RA and four-step RA; and
Option II: shared RO but separate preambles for two-step RA and four-step RA.

For the four-step RA procedure, the SSB to RO and preamble mapping is described in connection with FIGS. 1C-1F. For the two-step RA procedure, an SSB may be mapped to a RO and the corresponding preambles adaptively, according to the selected option (e.g., Option I or Option II) for PRACH configuration.

In order to address mobile broadband needs in unserved/underserved areas as well as public safety needs, maritime, airplane connectivity and railway communication service requirements applicable to satellite access, solutions for NR to support NTN (also called NR over NTN or NR NTN for short) may be proposed with respect to many use cases for 5G/NR satellite integration and the corresponding service requirements. The enhancements for NR NTN especially low-earth orbit (LEO) and geostationary earth orbit (GEO) with implicit compatibility may be implemented to support high altitude platform station (HAPS) and air to ground (ATG) scenarios, for example, according to one or more of the following principles:

FDD is assumed for NR-NTN (which does not imply that TDD cannot be used for relevant scenarios, e.g. HAPS, ATG); and
Earth fixed tracking area is assumed with Earth fixed and moving cells;
UEs with global navigation satellite system (GNSS) capabilities are assumed.

In the case of a UE with GNSS capability but without pre-compensation of timing and frequency offset capabilities, some enhancement on the PRACH sequence and/or format and extension of the ra-ResponseWindow duration may be needed.

According to some exemplary embodiments, there may be different types of satellites (or UAS platforms) used for NR NTN. Table 2 lists some types of satellites or UAS platforms as examples.

TABLE 2

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geo-stationary Earth Orbit (GEO) satellite | 35 786 km | Notional station keeping position fixed in terms of elevation/ azimuth with respect to a given earth point | 200-3500 km |
| UAS platform (including HAPS) | 8-50 km (20 km for HAPS) | | 5-200 km |
| High Elliptical Orbit (HEO) satellite | 400-50000 km | Elliptical around the earth | 200-3500 km |

Typically, GEO satellites and UAS platforms may be used to provide continental, regional or local service. A constellation of LEO and MEO satellites may be used to provide services in both Northern and Southern hemispheres. In some cases, the constellation can even provide global coverage including polar regions. For the later, this may require appropriate orbit inclination, sufficient beams generated and inter-satellite links.

Figure 3A:
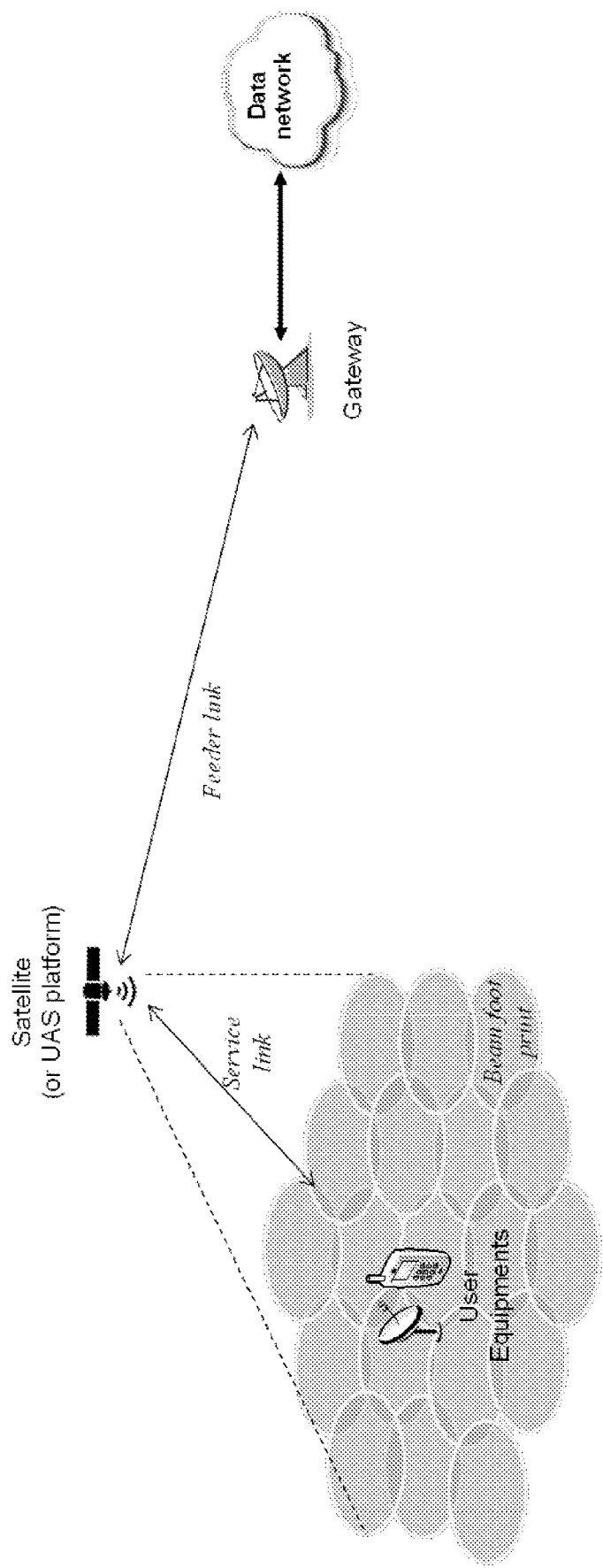
FIGS. 3A-3B are diagrams illustrating exemplary NTN typical scenarios according to some embodiments of the present disclosure.
Figure 3B:
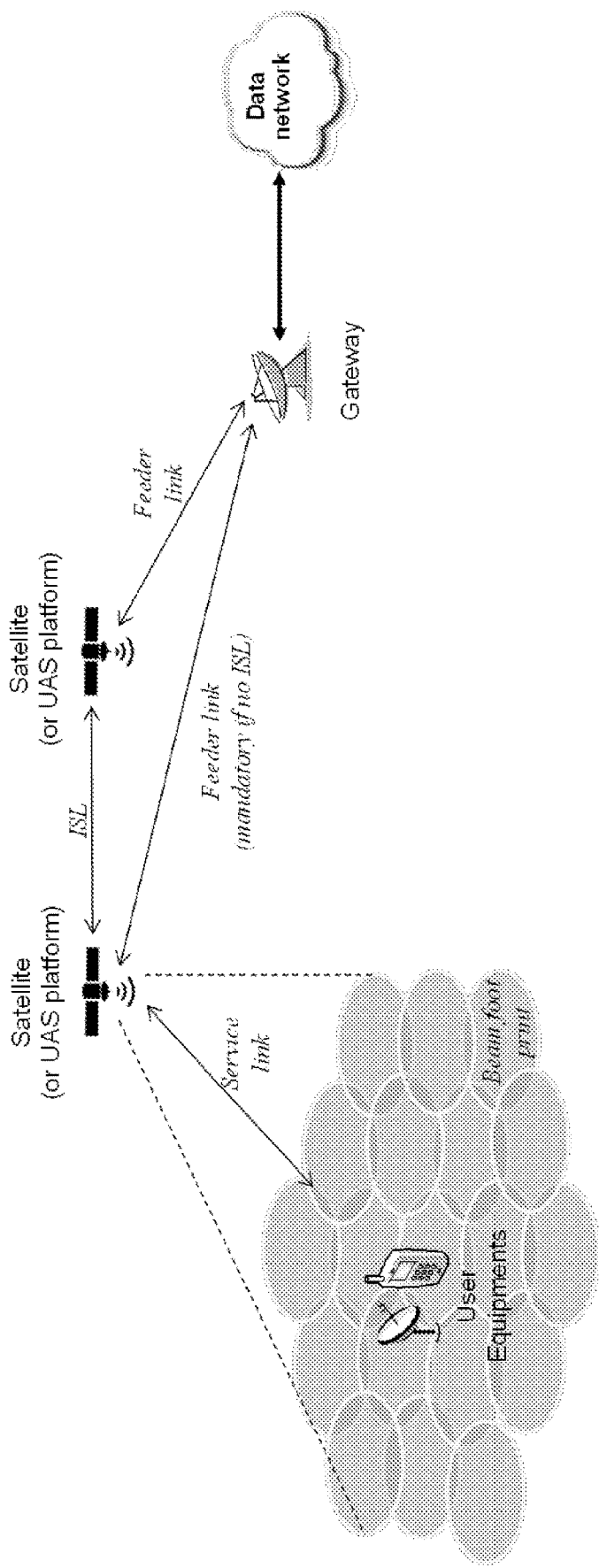

FIGS. 3A-3B are diagrams illustrating exemplary NTN typical scenarios according to some embodiments of the present disclosure. A terminal device such as a UE may be provided with network access in an NTN typical scenario based on transparent payload as shown in FIG. 3A, or based on regenerative payload as show in FIG. 3B. In accordance with an exemplary embodiment, an NTN typical scenario may typically include one or more of the following feature elements:

One or several sat-gateways (also called gateways for short) that connect the NTN to a public data network;
A GEO satellite is fed by one or several sat-gateways which are deployed across the satellite targeted coverage (e.g. regional or even continental coverage), assuming that UEs in a cell are served by only one sat-gateway.
A Non-GEO satellite served successively by one or several sat-gateways at a time (e.g., the system may need to ensure service and feeder link continuity between the successive serving sat-gateways with sufficient time duration to proceed with mobility anchoring and hand-over).
A feeder link or radio link between a sat-gateway and the satellite (or UAS platform);
A service link or radio link between the UE and the satellite (or UAS platform);
A satellite (or UAS platform) which may implement either a transparent or a regenerative (with on board processing) payload (e.g., the satellite or UAS platform may typically generate several beams over a given service area bounded by its field of view, the footprints of the beams are typically of elliptic shape, and the field of view of a satellite (or UAS platform) may depend on the on board antenna diagram and min elevation angle);
A transparent payload: radio frequency filtering, frequency conversion and amplification (in this case, the waveform signal repeated by the payload is un-changed);
A regenerative payload: radio frequency filtering, frequency conversion and amplification as well as demodulation/decoding, switch and/or routing, coding/modulation (this is effectively equivalent to having all or part of base station functions (e.g., a gNB) on board the satellite or UAS platform).
Inter-satellite links (ISLs) optionally in case of a constellation of satellites (this may require regenerative payloads on board the satellites, and ISL may operate in radio frequency or optical bands); and
One or more UEs served by the satellite (or UAS platform) within the targeted service area.

In the NTN, differential delay may be experienced by two UEs within the same cell. As a result, the preambles sent by different UEs in the same RO may reach the network at different time. In order to make sure the network can receive preambles from all the UEs, the preamble receiving window needs to start from [RO timing+minimum one way delay*2] and end with [RO timing+maximum one way delay*2].

Figure 3C:
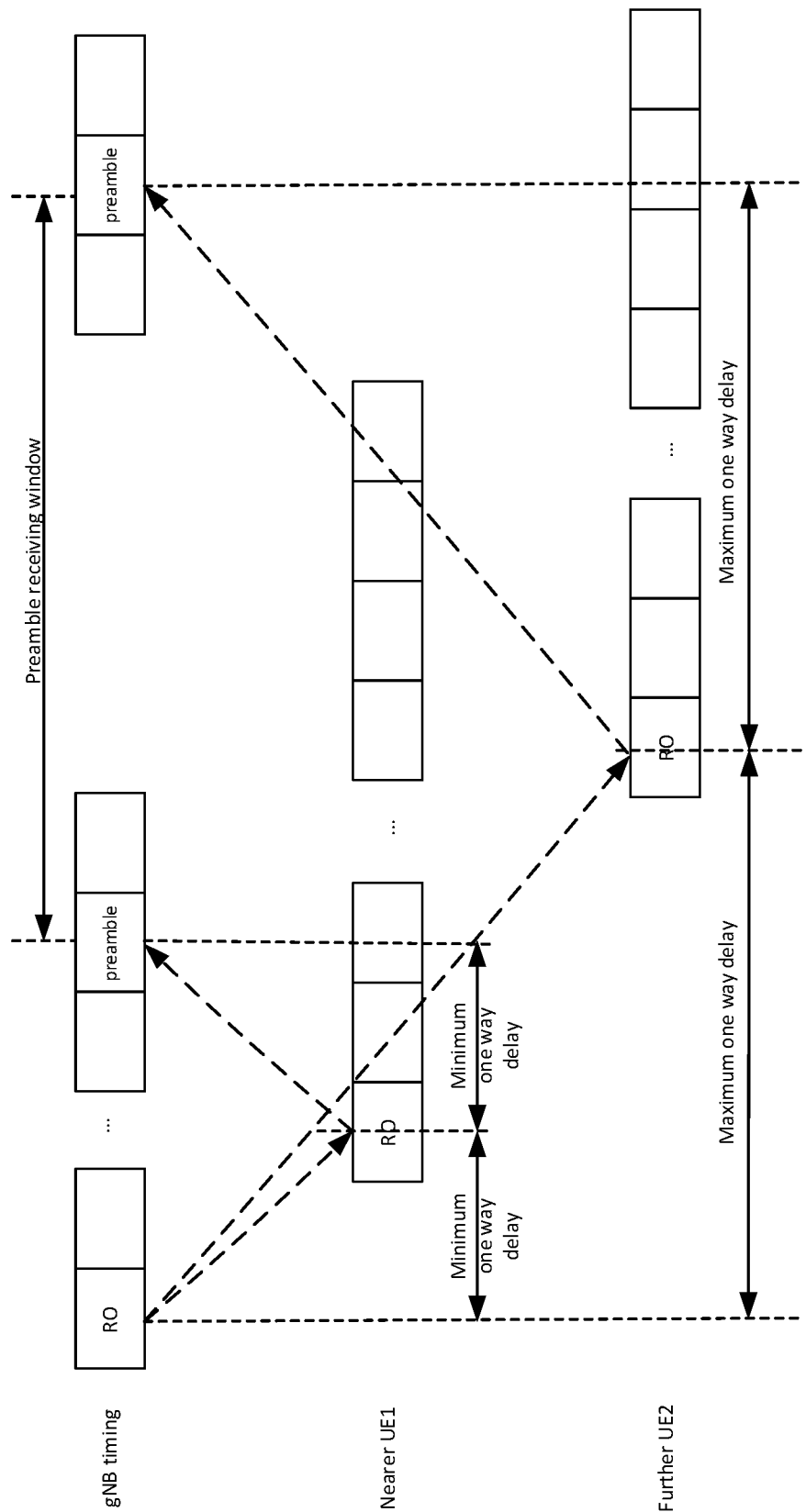
FIG. 3C is a diagram illustrating an exemplary preamble receiving window in an NTN according to an embodiment of the present disclosure.

FIG. 3C is a diagram illustrating an exemplary preamble receiving window in an NTN according to an embodiment of the present disclosure. In this embodiment, UE1 and UE2 are within the same cell served by a gNB (e.g., a satellite or UAS platform, etc.) in the NTN, and UE1 is nearer to the gNB compared to UE2. The minimum one way delay and the maximum one way delay may be estimated according to the propagation delay respectively experienced by UE1 and UE2 with respect to the gNB. Then the size of the preamble receiving window can be calculated based on the maximum one way differential delay (i.e., a difference between the maximum one way delay and the minimum one way delay). Within the preamble receiving window, the gNB may receive preambles sent by UE1 and UE2 in the same RO, as shown in FIG. 3C. In response to receiving a preamble, the gNB may need to know which RO the received preamble is related to, so as to estimate the accurate timing advance. If the RO periodicity is not long enough, the preamble receiving windows for two consecutive ROs may be overlapped with each other, making it difficult for the gNB to map the received preamble to the corresponding RO.

Figure 3D:
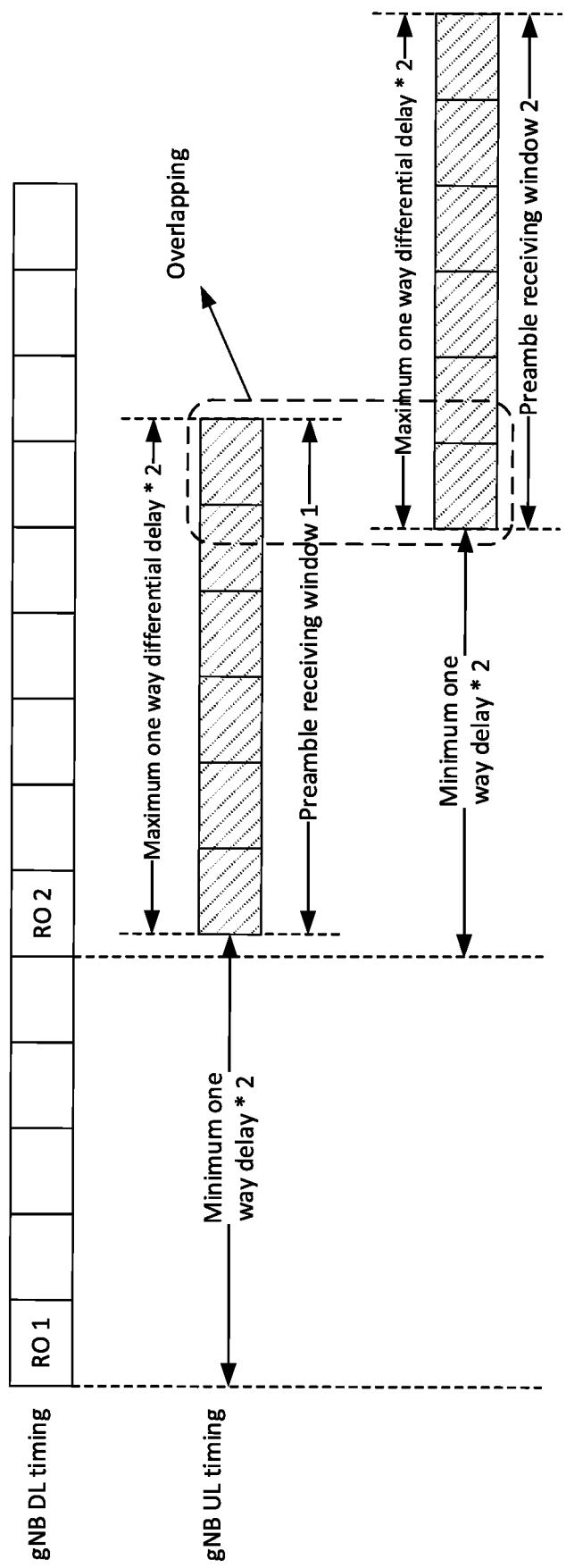
FIG. 3D is a diagram illustrating an example of ambiguity on preamble reception at the network side according to an embodiment of the present disclosure.

FIG. 3D is a diagram illustrating an example of ambiguity on preamble reception at the network side according to an embodiment of the present disclosure. As shown in FIG. 3D, since the RO periodicity (i.e., a time interval between two consecutive ROs such as RO1 and RO2) is small such that the preamble receiving windows (e.g., preamble receiving window 1 and preamble receiving window 2) for the two consecutive ROs overlap each other. In this case, the gNB may not be able to determine which RO is associated with the preamble received in the overlapping part.

Various exemplary embodiments of the present disclosure propose a solution for RA, which can enable RA preamble detection/reception to be performed (e.g., in NTN operation) without ambiguity. According to the proposed solution, there may be two schemes (i.e., scheme I and scheme II) applicable for a RA procedure. In exemplary embodiments for scheme I, the RO design and preamble division may be enhanced, for example, for msg1 in a four-step RA procedure and/or msgA in a two-step RA procedure, so as to avoid overlapping between the preamble receiving windows at the network side. Alternatively or additionally, according to scheme II applicable for msgA PUSCH in a two-step RA procedure, the PO design may be improved so that according to timing information indicated by PUSCH transmission explicitly or implicitly, a network node can determine which RO the received preamble is associated to, even if there may be overlapping between two preamble receiving windows. In this way, the RA procedure for a communication network (e.g. an NTN, etc.) may be performed with enhanced resource utilization and improved transmission efficiency and flexibility.

For four-step RA, msg1 is only transmitted with a preamble in a RO. Configuration of RO period may be dependent on some network parameters such as max_delay. Optionally, different preamble groups may be used for different ROs, so as to differentiate the ROs. According to scheme I, RO design may be optimized to avoid ambiguity on the mapping from the received preamble to an associated RO. It can be appreciated that although various exemplary embodiments for scheme I are described mainly with respect to four-step RA, the embodiments of scheme I also may be applicable to two-step RA.

According to an exemplary embodiment for scheme I, a PRACH mask may be used to invalidate some of the ROs configured for a TN, so that only a subset of the ROs in a predetermined time duration may be valid for RA in an NTN. In an embodiment, a bit map mask may be introduced to indicate which subset of the ROs within a PRACH configuration period is used for the NTN. The bit map mask may be represented by a 5-bit indicator {PRACH_MASK_NTN: a0 a1 a2 a3 a4}, where the value of ai (i=0, 1, 2, 3, 4) indicates whether the corresponding subframe number in column "Subframe number" of a PRACH configuration table (e.g., Table 1) is valid.

ai=0 means the ith (numbered from the most significant bit (MSB) to the least significant bit (LSB), and from left to right) value of the subframe number in column "Subframe number" is invalidated; and ai=1 means the ith (numbered from MSB to LSB, and from left to right) value of the subframe number in column "Subframe number" is valid.

As an example, if "PRACH Configuration Index" according to Table 1 is 25, and the bit map mask is 00100b, then only subframe indicated by "8" may be supported for the NTN RA in the system frames configured.

In accordance with some exemplary embodiments for scheme I, a longer RO period may be configured for NTN operation. The longer RO period configured for NTN operation may be determined based at least in part on a RO period configured for TN operation. According to an embodiment, an offset to the RO period for TN operation may be indicated in e.g. SIB1 for extension of the PRACH configuration period. Then the RO period for NTN operation may be obtained according to the offset. Alternatively or additionally, a separate definition of RO period may be configured, for example, by including the NTN RO period in the modified PRACH configuration table. Table 3 shows a part of an exemplary modified PRACH configuration table. In Table 3, a column "Subframe number NTN" is included to support only one RO per at least 10 ms for NTN operation.

TABLE 3

| PRACH Configuration Index | Preamble format | $n_{SFN}$ mod x = y | | Subframe number | Subframe number NTN | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|---|
| | | x | y | | | | | | |
| 0 | 0 | 16 | 1 | 9 | — | 0 | — | — | 0 |
| 1 | 0 | 8 | 1 | 9 | — | 0 | — | — | 0 |
| 2 | 0 | 4 | 1 | 9 | — | 0 | — | — | 0 |
| 3 | 0 | 2 | 0 | 9 | — | 0 | — | — | 0 |
| 4 | 0 | 2 | 1 | 9 | — | 0 | — | — | 0 |
| 5 | 0 | 2 | 0 | 4 | — | 0 | — | — | 0 |
| 6 | 0 | 2 | 1 | 4 | — | 0 | — | — | 0 |
| 7 | 0 | 1 | 0 | 9 | — | 0 | — | — | 0 |
| 8 | 0 | 1 | 0 | 8 | — | 0 | — | — | 0 |
| 9 | 0 | 1 | 0 | 7 | — | 0 | — | — | 0 |
| 10 | 0 | 1 | 0 | 6 | — | 0 | — | — | 0 |
| 11 | 0 | 1 | 0 | 5 | — | 0 | — | — | 0 |
| 12 | 0 | 1 | 0 | 4 | — | 0 | — | — | 0 |
| 13 | 0 | 1 | 0 | 3 | — | 0 | — | — | 0 |
| 14 | 0 | 1 | 0 | 2 | — | 0 | — | — | 0 |
| 15 | 0 | 1 | 0 | 1, 6 | 1 | 0 | | | 0 |
| 16 | 0 | 1 | 0 | 1, 6 | 6 | 7 | — | — | 0 |
| 17 | 0 | 1 | 0 | 4, 9 | 4 | 0 | — | — | 0 |
| 18 | 0 | 1 | 0 | 3, 8 | 8 | 0 | — | — | 0 |
| 19 | 0 | 1 | 0 | 2, 7 | 2 | 0 | — | — | 0 |
| 20 | 0 | 1 | 0 | 8, 9 | 9 | 0 | — | — | 0 |
| 21 | 0 | 1 | 0 | 4, 8, 9 | 4 | 0 | — | — | 0 |
| 22 | 0 | 1 | 0 | 3, 4, 9 | 3 | 0 | — | — | 0 |
| 23 | 0 | 1 | 0 | 7, 8, 9 | 7 | 0 | — | — | 0 |
| 24 | 0 | 1 | 0 | 3, 4, 8, 9 | 3 | 0 | — | — | 0 |
| 25 | 0 | 1 | 0 | 6, 7, 8, 9 | 8 | 0 | — | — | 0 |
| 26 | 0 | 1 | 0 | 1, 4, 6, 9 | 1 | 0 | — | — | 0 |
| 27 | 0 | 1 | 0 | 1, 3, 5, 7, 9 | 9 | 0 | — | — | 0 |

According to another embodiment for scheme I, one or more new PRACH configuration tables compared to the legacy PRACH configuration table such as Table 1 may be introduced for NTN operation. Table 4 shows a part of an exemplary PRACH configuration table applicable for NTN operation.

TABLE 4

| PRACH Configuration Index | Preamble format | $n_{SFN}$ mod x = y | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 32 | 1 | 9 | 0 | — | — | 0 |
| 1 | 0 | 16 | 1 | 9 | 0 | — | — | 0 |
| 2 | 0 | 16 | 1 | 9 | 0 | — | — | 0 |
| 3 | 0 | 8 | 0 | 9 | 0 | — | — | 0 |
| 4 | 0 | 2 | 1 | 9 | 0 | — | — | 0 |
| 5 | 0 | 2 | 0 | 4 | 0 | — | — | 0 |
| 6 | 0 | 2 | 1 | 4 | 0 | — | — | 0 |
| 7 | 0 | 1 | 0 | 9 | 0 | — | — | 0 |
| 8 | 0 | 1 | 0 | 8 | 0 | — | — | 0 |
| 9 | 0 | 1 | 0 | 7 | 0 | — | — | 0 |
| 10 | 0 | 1 | 0 | 6 | 0 | — | — | 0 |
| 11 | 0 | 1 | 0 | 5 | 0 | — | — | 0 |
| 12 | 0 | 1 | 0 | 4 | 0 | — | — | 0 |
| 13 | 0 | 1 | 0 | 3 | 0 | — | — | 0 |
| 14 | 0 | 1 | 0 | 2 | 0 | — | — | 0 |
| 15 | 0 | 1 | 0 | 1 | 0 | | | |

In Table 4, a column "Subframe number" is included to support only one RO per at least 10 ms for NTN operation, and optionally the value of x may indicate a longer PRACH configuration period compared with more system frames compared to the PRACH configuration period for TN operation (e.g., as shown in Table 1). According to an embodiment, the PRACH configuration table may be maintained as a compressed simplified table which may only support NTN operation.

In accordance with some exemplary embodiments, unified RO design requirement may be applicable for both two-step RA and four-step RA. In the case that the two-step ROs and four-step ROs are shared, the timing requirement for four-step RA is also met for two-step RA, since the timing gap between ROs are the same between two-step RA and four-step RA. In the case that the two-step ROs and four-step ROs are separately configured, then a separate set of configurations similar to the configurations for four-step RO design may be used for two-step RO design in NTN operation. For either case, various embodiment for scheme I to avoid overlapping between preamble receiving windows corresponding to different ROs may be applicable for two-step RA and four-step RA.

According to various embodiments for scheme I, there may be no overlapping between the preamble receiving windows corresponding to different ROs at the network side. This may be important for a RA procedure so that the RO to PO mapping may not be broken. In addition, as is known for msgA in two-step RA, the RO set relative to the PO set may have a fixed offset cell specifically configured per BWP, overlapping between the preamble receiving windows corresponding to different ROs means that PUSCH transmissions in different corresponding POs may also overlap each other. This may cause msgA PUSCH performance degradation. Therefore, avoiding overlapping between the preamble receiving windows also can improve PUSCH transmission performance.

In accordance with some exemplary embodiments for scheme II, msgA design with timing information related to ROs may be supported for two-step RA in NTN. For two-step RA, msgA may include preamble part and msgA PUSCH part, and the two parts may be one to one or multiple to one mapped to each other. As described with respect to FIG. 2, the preamble may be transmitted in a RO, and the msgA PUSCH (also called PUSCH for short) may be transmitted in a PO. It may be advantageous to indicate timing information of a RO by PUSCH transmission, because according to the received msgA PUSCH, a network node (e.g., the gNB in FIG. 3D) can get the corresponding timing information to identify the RO associated to the preamble received by the network node.

In accordance with some exemplary embodiments for scheme II, the PUSCH transmission may directly or indirectly indicate one or more kinds of the following RO timing information:
  an index of a system frame number (SFN) which is associated with RO configuration;
  a subframe index within one system frame;
  a RO index within one subframe; and
  a PRACH slot index in one system frame (e.g., this index may have low priority, since the random access-radio network temporary identifier (RA-RNTI) may be already used for PUSCH scrambling).

In the case that an SFN index (and/or other timing information) is expected to be carried by msgA PUSCH, the SFN range and how the SFN is indicated can be achieved based at least in part on the specific network configuration and communication environment. According to an exemplary embodiment, the SFN range may be the same as the SFN range of an extended RAR/msgB window for an NTN compared to a TN, e.g. 40 ms for two-step RA, which means at least a 2-bit SFN index may be needed. The SFN index may be explicitly or implicitly indicated by PUSCH transmission. In this case, the number of system frames that cover the time duration to resolve the preamble ambiguity can be aligned with the number of system frames in a RAR/msgB window.

In accordance with some exemplary embodiments for scheme II, the RO timing information may be predetermined, or dynamically configured by the network node. Alternatively or additionally, parameters and/or values related to the RO timing information may be set or adjusted according to different scenarios (e.g., different cell sizes, different altitudes of satellites, etc.), and/or other related network configurations (e.g., RAR/msgB window configuration, etc.).

In accordance with some exemplary embodiments for scheme II, the RO timing information may be indicated by the PUSCH transmission according to one or more of the following approaches:

Carrying the timing information as part of the PUSCH data information;

Multiplexing the timing information with PUSCH data, e.g. as uplink control information (UCI); and Implicitly indicating the timing information by PUSCH scrambling sequence generation.

In accordance with some exemplary embodiments, the network node may obtain the RO timing information across system frames (e.g., an SFN index or other possible information), so as to estimate a range of time duration related to the RO configuration. Alternatively or additionally, the network node may obtain the timing information within one system frame, for example, indirectly by a random access-radio network temporary identifier (RA-RNTI) which may be used in the scrambling of PUSCH. In an exemplary embodiment, the scrambling sequence generator $c_{init\_NTN}$ for msgA on PUSCH may be initialized according to the following formula:

$$c_{init\_NTN} = n_{RNTI} \cdot 2^{16} + n_{RAPID} \cdot 2^{10} (n_{ID} + SFN_{ID}) \bmod 2^{10} \quad (1)$$

where $SFN_{ID}$ is the index or identifier (ID) of system frame number which is related to RO configuration;

$n_{ID} \in \{0, 1, \ldots, 1023\}$ equals the higher-layer parameter dataScramblingIdentityPUSCH if configured and the RNTI may comprise the cell-radio network temporary identifier (C-RNTI), modulation and coding scheme-cell-radio network temporary identifier (MCS-C-RNTI), semi-persistent-channel state information-radio network temporary identifier (SP-CSI-RNTI) or cell specific-radio network temporary identifier (CS-RNTI), and the transmission is not scheduled using downlink control information (DCI) format 0_0 in a common search space;

$n_{ID} \in \{0, 1, \ldots, 1023\}$ equals the higher-layer parameter msgA-dataScramblingIdentity if configured and the PUSCH transmission is triggered by a Type-2 random access procedure;

$n_{ID}$ equals the physical layer cell identity $N_{ID}^{cell}$ otherwise;

$n_{RAPID}$ is the index or identifier (ID) of the preamble transmitted for msgA; and $n_{RNTI}$ equals the RA-RNTI for msgA and otherwise corresponds to the RNTI associated with the PUSCH transmission.

In accordance with an exemplary embodiment, in addition or alternative to using formula (1), the scrambling sequence generator $c_{init\_NTN}$ also may be obtained in any other suitable manners, e.g., by modifying the scrambling sequence generator $c_{init}$ for msgA on PUSCH as defined in 3GPP TS 38.211 V16.0.0.

In accordance with some exemplary embodiments for scheme II, the RO timing information may be implicitly indicated by the PO detection. For example, the network node may try to decode PUSCHs on two POs which may be mapped to two possible ROs corresponding to two overlapped preamble receiving windows. The PO with PUSCH correctly decoded may be used to determine the corresponding RO actually used. Here the PUSCHs on two POs may be transmitted with different RNTIs. This embodiment may mainly be used for the smaller maximum one way differential delay (e.g. for LEO case). It can be appreciated that ROs may not be allowed to overlap each other due to large initial timing difference between UEs.

It can be realized that parameters, variables and settings related to the signaling transmission and RA configuration described herein are just examples. Other suitable parameter settings, the associated configurations and the specific values thereof may also be applicable to implement the proposed methods.

It is noted that some embodiments of the present disclosure are mainly described in relation to 5G or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 4A:
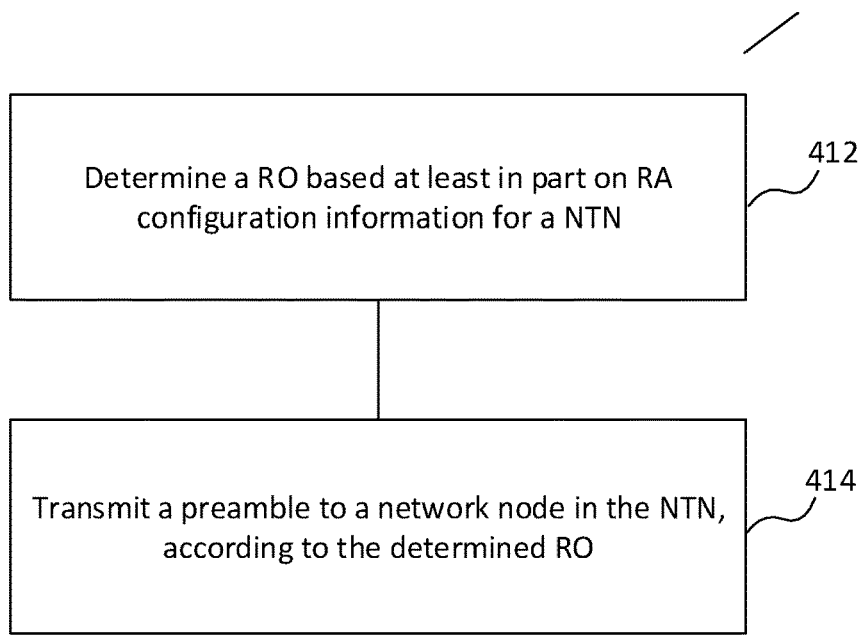
FIG. 4A is a flowchart illustrating a method according to some embodiments of the present disclosure.

FIG. 4A is a flowchart illustrating a method 410 according to some embodiments of the present disclosure. The method 410 illustrated in FIG. 4A may be performed by a terminal device or an apparatus communicatively coupled to the terminal device. In accordance with an exemplary embodiment, the terminal device (e.g., a UE, a MS or any other suitable end device) may be configured to communicate with a network node (e.g., a gNB, a satellite, a UAS platform or any other suitable network entity with NTN capabilities) by supporting one or more RA approaches such as two-step RA and/or four-step RA.

According to the exemplary method 410 illustrated in FIG. 4A, the terminal device can determine a RO based at least in part on RA configuration information for an NTN, as shown in block 412. In accordance with some exemplary embodiments, the RA configuration information may be applicable to at least one of a four-step RA procedure and a two-step RA procedure. According to the determined RO, the terminal device may transmit a preamble to a network node in the NTN, as shown in block 414. It can be appreciated that the exemplary method 410 as illustrated in FIG. 4A may be performed for many use cases of scheme I.

In accordance with some exemplary embodiments, the RA configuration information may indicate configuration of two consecutive ROs so that a time interval between the two consecutive ROs may be equal to or larger than an interval threshold. According to an embodiment, the interval threshold may be determined based at least in part on a maximum one way delay and a minimum one way delay of signal transmission in the NTN. For example, the interval threshold may be set as [the maximum one way differential delay*2] or any other suitable value.

In accordance with some exemplary embodiments, the RA configuration information may indicate configuration of two consecutive ROs so that two preamble receiving windows associated with the two consecutive ROs are not overlapped. For example, the RA configuration information for the NTN may indicate only one RO per at least 10 ms.

In accordance with some exemplary embodiments, the RA configuration information may indicate a first set of ROs configured for the NTN in a predetermined time duration.

The first set of ROs may be a subset of a second set of ROs configured for a TN in the predetermined time duration. According to an embodiment, the RA configuration information may comprise a first bit map mask (e.g., PRACH_MASK_NTN as described with respect to Table 1) to indicate one or more subframes within one or more system frames, and the first set of ROs for the NTN may be configured on the one or more subframes.

In accordance with some exemplary embodiments, the RA configuration information may comprise a second bit map mask to invalidate one or more of a second set of ROs configured for a TN in a predetermined time duration, so that only a subset of the second set of ROs in the predetermined time duration are valid for the NTN. It can be appreciated that the first and second bit map masks may be represented by the same parameter or different parameters.

In accordance with some exemplary embodiments, the RA configuration information may indicate a RO configuration period (e.g., a value of x shown in Table 4). The length of the RO configuration period may meet a specific criterion for the NTN (e.g., x is larger than a specific value so that the RO configuration is sparse enough). This specific criterion may be adjusted based at least in part on different network deployments and communication environments. According to an embodiment, the RA configuration information may comprise an offset to a RA configuration period for a TN to indicate the RA configuration period for the NTN. The offset may extend the RA configuration period for the TN to achieve the RA configuration period for the NTN.

In accordance with some exemplary embodiments, the RA configuration information may be received from the network node by the terminal device. For example, the RA configuration information may be carried by broadcast signaling or system information (e.g., SIB1, etc.) from the network node. Alternatively or additionally, the RA configuration information may be predetermined for the NTN separately from the TN. For example, the RA configuration information may be maintained in a table for the NTN (e.g., Table 3 and Table 4).

In accordance with some exemplary embodiments, the RA configuration information may comprise a RA configuration period for the NTN in number of system frames (e.g., parameter x in Table 3 and Table 4), and/or an indicator of a subframe on which a RO for the NTN may be configured (e.g., parameter "Subframe number NTN" in Table 3 and parameter "Subframe number" in Table 4). Alternatively or additionally, the RA configuration information may comprise other proper timing information related to RO configuration.

Figure 4B:
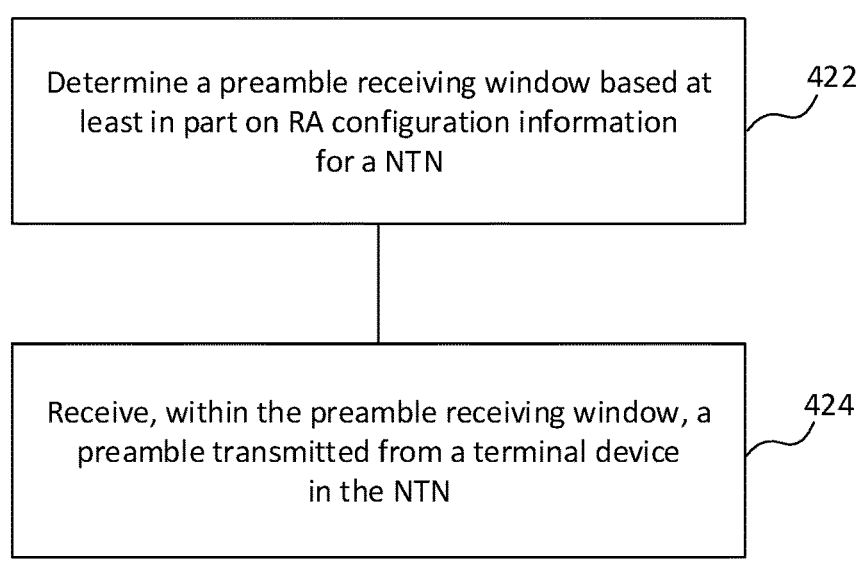
FIG. 4B is a flowchart illustrating another method according to some embodiments of the present disclosure.

FIG. 4B is a flowchart illustrating a method 420 according to some embodiments of the present disclosure. The method 420 illustrated in FIG. 4B may be performed by a network node or an apparatus communicatively coupled to the network node. In accordance with an exemplary embodiment, the network node may comprise a base station (e.g., a gNB, a satellite, a UAS platform, etc.). The network node may be configured to communicate with one or more terminal devices such as UEs which may be able to support one or more RA approaches such as two-step RA and/or four-step RA.

According to the exemplary method 420 illustrated in FIG. 4B, the network node can determine a preamble receiving window based at least in part on RA configuration information for an NTN, as shown in block 422. Within the preamble receiving window, the network node may receive a preamble transmitted from a terminal device (e.g., the terminal device described with respect to FIG. 4A) in the NTN, as shown in block 424.

In accordance with some exemplary embodiments, the RA configuration information for the NTN as described with respect to the method 420 illustrated in FIG. 4B may correspond to the RA configuration information for the NTN as described with respect to the method 410 illustrated in FIG. 4A. Thus, the RA configuration information used by the network node as described with respect to the method 420 may have the same or similar contents and feature elements as the RA configuration information used by the terminal device as described with respect to the method 410.

In accordance with some exemplary embodiments, the RA configuration information may be transmitted to the terminal device by the network node. Alternatively or additionally, the network node and/or the terminal device may store the RA configuration information (e.g., which may be predetermined by specific communication standards) in a table (e.g., Table 3 and Table 4) or any other suitable form. According to the RO design requirement, the RA configuration information for the NTN may be used for two-step RA and/or four-step RA.

Figure 5A:
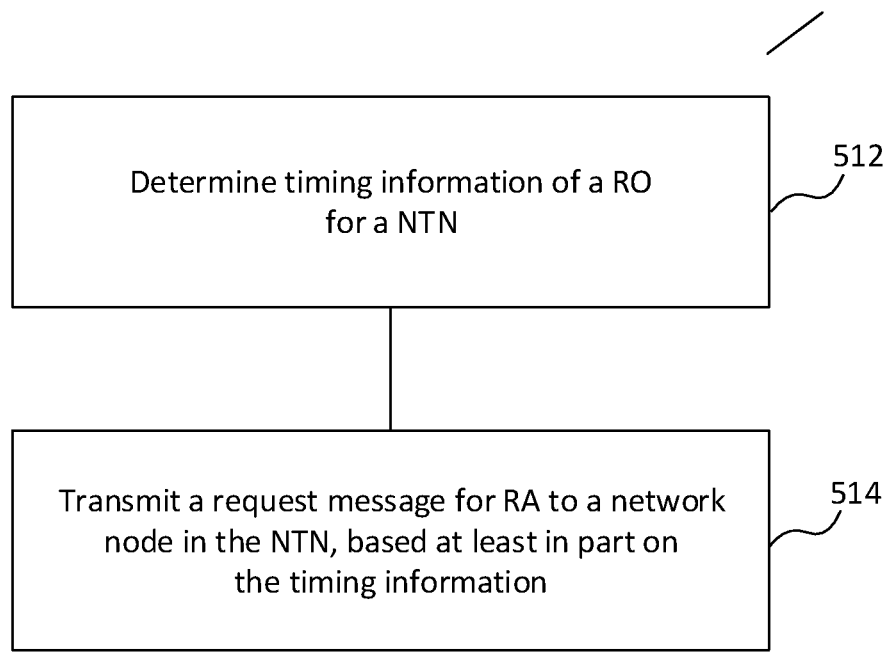
FIG. 5A is a flowchart illustrating yet another method according to some embodiments of the present disclosure.

FIG. 5A is a flowchart illustrating a method 510 according to some embodiments of the present disclosure. The method 510 illustrated in FIG. 5A may be performed by a terminal device or an apparatus communicatively coupled to the terminal device. In accordance with an exemplary embodiment, the terminal device (e.g., a UE, a MS or any other suitable end device) may be configured to communicate with a network node (e.g., a gNB, a satellite, a UAS platform or any other suitable network entity with NTN capabilities) by supporting one or more RA approaches such as two-step RA and/or four-step RA.

According to the exemplary method 510 illustrated in FIG. 5A, the terminal device may determine timing information of a RO for an NTN, as shown in block 512. Based at least in part on the timing information, the terminal device may transmit a request message for RA (e.g., msgA for a two-step RA procedure, etc.) to a network node in the NTN, as shown in block 514. The transmission of the request message may comprise a preamble transmission in the RO and a shared channel transmission in a shared channel occasion (e.g., msgA PUSCH transmission in a PO). According to some exemplary embodiment, the timing information may be indicated by the shared channel transmission (e.g., msgA PUSCH transmission).

In accordance with some exemplary embodiments, the timing information may comprise at least one of:

an indicator of a system frame (e.g., an SFN index, etc.);

an indicator of a subframe within a system frame (e.g., a subframe number, etc.);

an indicator of a RO within a subframe (e.g., a RO index, etc.); and an indicator of a random access channel slot in a system frame (e.g., a PRACH slot index, etc.).

In accordance with some exemplary embodiments, the indicator of the system frame may comprise a bit sequence. The length of the bit sequence may be based at least in part on a size of a RAR/masB window for the NTN. For example, if the size of the RAR/masB window for two-step RA in the NTN is set to 40 ms, then the indicator of the system frame may be a 2-bit sequence number.

In accordance with some exemplary embodiments, the indication of the timing information by the shared channel transmission may comprise at least one of:

- including the timing information as a part of data information carried in the shared channel transmission (e.g., as a part of data information of msgA PUSCH);
- multiplexing the timing information with the data information carried in the shared channel transmission (e.g., as UCI or other proper information multiplexed with PUSCH data);
- generating a scrambling sequence for the shared channel transmission based at least in part on the timing information (e.g., according to formula (1) or other suitable rules); and
- using an association between the RO and the shared channel occasion (e.g., a PO) to indicate the timing information (e.g., according to PO detection).

Figure 5B:
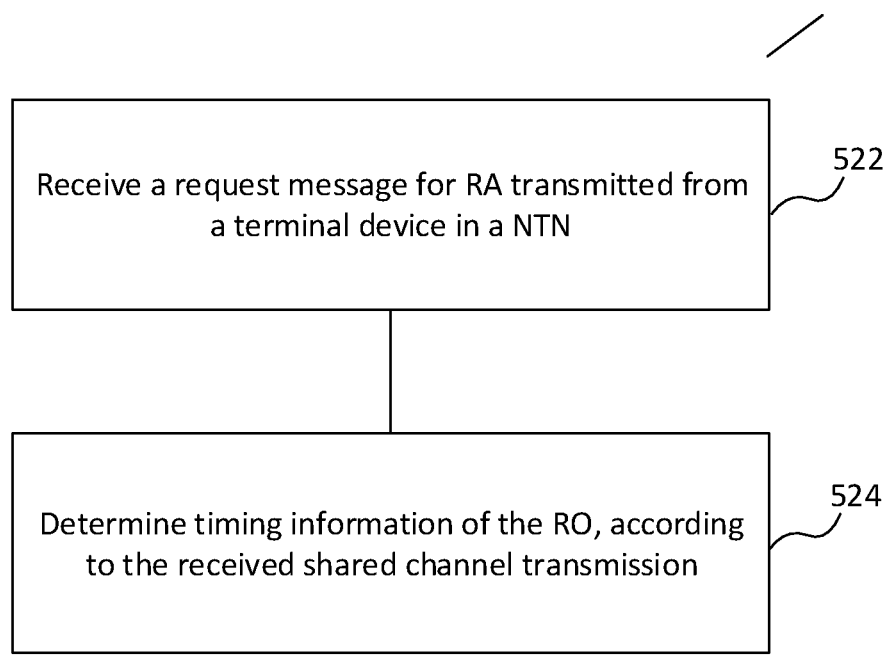
FIG. 5B is a flowchart illustrating a further method according to some embodiments of the present disclosure.

FIG. 5B is a flowchart illustrating a method 520 according to some embodiments of the present disclosure. The method 520 illustrated in FIG. 5B may be performed by a network node or an apparatus communicatively coupled to the network node. In accordance with an exemplary embodiment, the network node may comprise a base station (e.g., a gNB, a satellite, a UAS platform, etc.). The network node may be configured to communicate with one or more terminal devices such as UEs which may be able to support one or more RA approaches such as two-step RA and/or four-step RA.

According to the exemplary method 520 illustrated in FIG. 5B, the network node may receive a request message for RA (e.g., msgA, etc.) transmitted from a terminal device (e.g., the terminal device described with respect to FIG. 5A) in an NTN, as shown in block 522. The transmission of the request message may comprise a preamble transmission in a RO and a shared channel transmission in a shared channel occasion (e.g., PUSCH transmission in a PO). According to the received shared channel transmission, the network node can determine timing information of the RO, as shown in block 524.

In accordance with some exemplary embodiments, the timing information of the RO as described with respect to the method 520 illustrated in FIG. 5B may correspond to the timing information of the RO as described with respect to the method 510 illustrated in FIG. 5A. Thus, the timing information of the RO determined by the network node as described with respect to the method 520 may have the same or similar contents and feature elements as the timing information of the RO determined by the terminal device as described with respect to the method 510.

In accordance with some exemplary embodiments, the determination of the timing information of the RO by the network node may comprise at least one of:

- determining the timing information which may be included as a part of data information carried in the shared channel transmission (e.g., as a part of data information of msgA PUSCH);
- determining the timing information which may be multiplexed with the data information carried in the shared channel transmission (e.g., as UCI or other possible information multiplexed with PUSCH data);
- determining the timing information according to a scrambling sequence for the shared channel transmission which may be generated based at least in part on the timing information (e.g., according to formula (1) or other suitable rules); and
- determining the timing information by using an association between the RO and the shared channel occasion (e.g., a PO).

In accordance with some exemplary embodiments, the network node may obtain timing advance according to the timing information. Alternatively or additionally, the network node may transmit a response (e.g., a RAR/msgB, etc.) to the request message for RA to the terminal device according to the timing information.

Various exemplary embodiments according to the present disclosure may enable RO configuration and/or PO configuration in a RA procedure to be adaptive to NTN operation. In accordance with exemplary embodiments for scheme I, RO configuration may be designed for msg1/msgA to avoid overlapping of preamble receiving windows and ambiguity on association between preamble and RO by a network node. Alternatively or additionally, no matter whether the consecutive preamble receiving windows overlap each other due to long propagation delay or other possible factors, exemplary embodiments for scheme II can enable the network node to map the received preamble to the corresponding RO according to timing information indicated by PUSCH transmission. Application of various exemplary embodiments can improve flexibility of RO configuration and/or PO configuration and enhance performance of a RA procedure.

The various blocks shown in FIGS. 4A-4B and FIGS. 5A-5B may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 6:
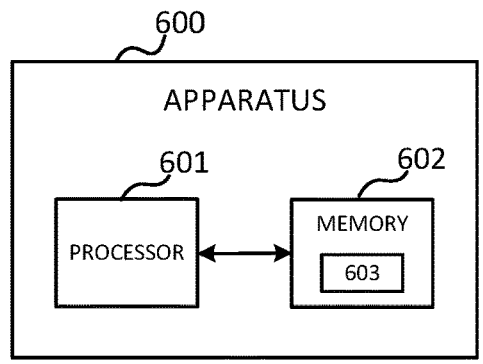
FIG. 6 is a block diagram illustrating an apparatus according to some embodiments of the present disclosure.

FIG. 6 is a block diagram illustrating an apparatus 600 according to various embodiments of the present disclosure. As shown in FIG. 6, the apparatus 600 may comprise one or more processors such as processor 601 and one or more memories such as memory 602 storing computer program codes 603. The memory 602 may be non-transitory machine/processor/computer readable storage medium. In accordance with some exemplary embodiments, the apparatus 600 may be implemented as an integrated circuit chip or module that can be plugged or installed into a terminal device as described with respect to FIG. 4A or FIG. 5A, or a network node as described with respect to FIG. 4B or FIG. 5B. In such case, the apparatus 600 may be implemented as a terminal device as described with respect to FIG. 4A or FIG. 5A, or a network node as described with respect to FIG. 4B or FIG. 5B.

In some implementations, the one or more memories 602 and the computer program codes 603 may be configured to, with the one or more processors 601, cause the apparatus 600 at least to perform any operation of the method as described in connection with FIG. 4A. In some implementations, the one or more memories 602 and the computer program codes 603 may be configured to, with the one or more processors 601, cause the apparatus 600 at least to perform any operation of the method as described in connection with FIG. 4B. In some implementations, the one or more memories 602 and the computer program codes 603 may be configured to, with the one or more processors 601, cause the apparatus 600 at least to perform any operation of the method as described in connection with FIG. 5A. In other implementations, the one or more memories 602 and the computer program codes 603 may be configured to, with the one or more processors 601, cause the apparatus 600 at least to perform any operation of the method as described in connection with FIG. 5B. Alternatively or additionally, the one or more memories 602 and the computer program codes 603 may be configured to, with the one or more processors 601, cause the apparatus 600 at least to perform more or less operations to implement the proposed methods according to the exemplary embodiments of the present disclosure.

Figure 7A:
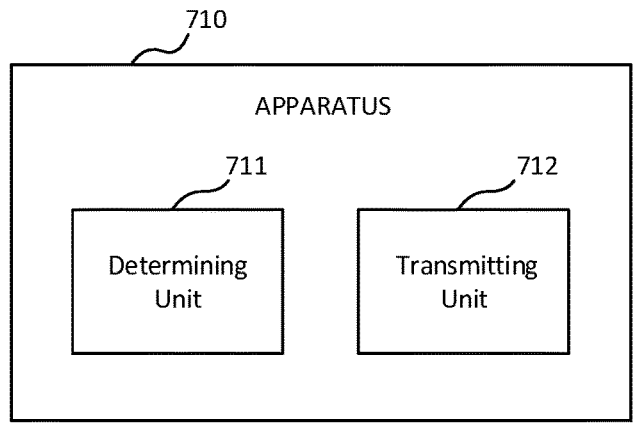
FIG. 7A is a block diagram illustrating another apparatus according to some embodiments of the present disclosure.

FIG. 7A is a block diagram illustrating an apparatus 710 according to some embodiments of the present disclosure. As shown in FIG. 7A, the apparatus 710 may comprise a determining unit 711 and a transmitting unit 712. In an exemplary embodiment, the apparatus 710 may be implemented in a terminal device such as a UE. The determining unit 711 may be operable to carry out the operation in block 412, and the transmitting unit 712 may be operable to carry out the operation in block 414. Optionally, the determining unit 711 and/or the transmitting unit 712 may be operable to carry out more or less operations to implement the proposed methods according to the exemplary embodiments of the present disclosure.

Figure 7B:
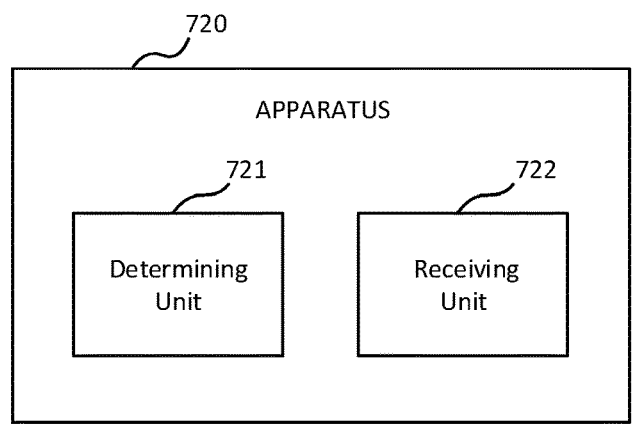
FIG. 7B is a block diagram illustrating another apparatus according to some embodiments of the present disclosure.

FIG. 7B is a block diagram illustrating an apparatus 720 according to some embodiments of the present disclosure. As shown in FIG. 7B, the apparatus 720 may comprise a determining unit 721 and a receiving unit 722. In an exemplary embodiment, the apparatus 720 may be implemented in a network node such as a gNB (e.g., a satellite or UAS platform, etc.). The determining unit 721 may be operable to carry out the operation in block 422, and the receiving unit 722 may be operable to carry out the operation in block 424. Optionally, the determining unit 721 and/or the receiving unit 722 may be operable to carry out more or less operations to implement the proposed methods according to the exemplary embodiments of the present disclosure.

Figure 8A:
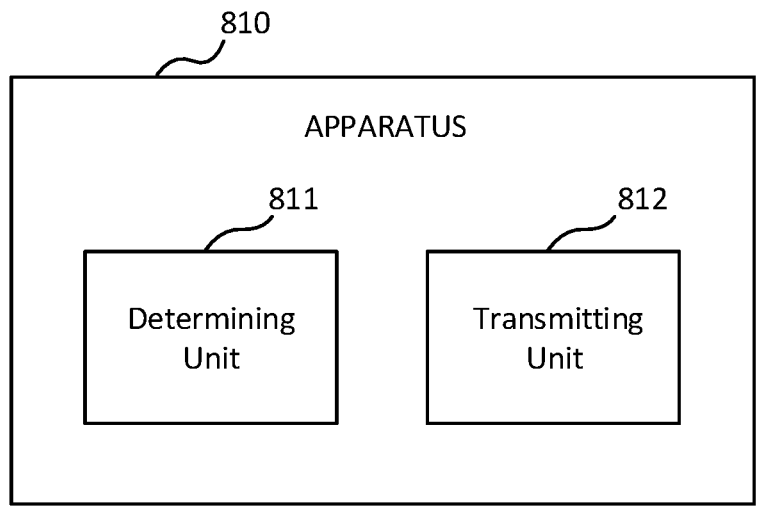
FIG. 8A is a block diagram illustrating yet another apparatus according to some embodiments of the present disclosure.

FIG. 8A is a block diagram illustrating an apparatus 810 according to some embodiments of the present disclosure. As shown in FIG. 8A, the apparatus 810 may comprise a determining unit 811 and a transmitting unit 812. In an exemplary embodiment, the apparatus 810 may be implemented in a terminal device such as a UE. The determining unit 811 may be operable to carry out the operation in block 512, and the transmitting unit 812 may be operable to carry out the operation in block 514. Optionally, the determining unit 811 and/or the transmitting unit 812 may be operable to carry out more or less operations to implement the proposed methods according to the exemplary embodiments of the present disclosure.

Figure 8B:
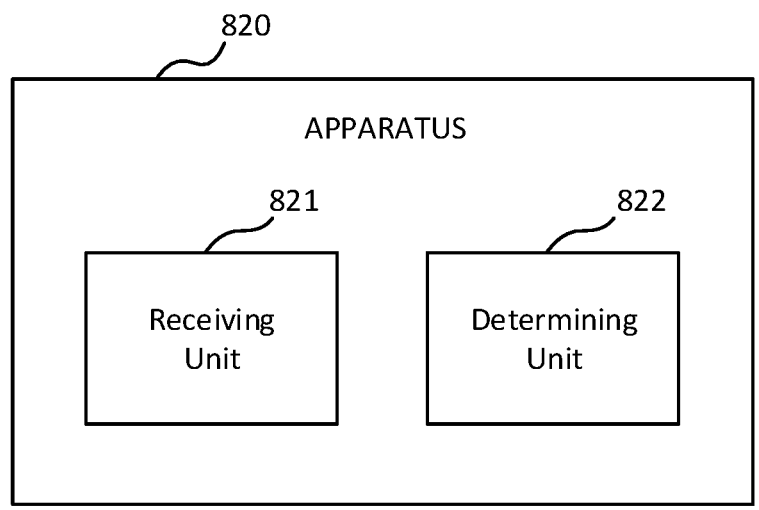
FIG. 8B is a block diagram illustrating a further apparatus according to some embodiments of the present disclosure.

FIG. 8B is a block diagram illustrating an apparatus 820 according to some embodiments of the present disclosure. As shown in FIG. 8B, the apparatus 820 may comprise a receiving unit 821 and a determining unit 822. In an exemplary embodiment, the apparatus 820 may be implemented in a network node such as a gNB (e.g., a satellite or UAS platform, etc.). The receiving unit 821 may be operable to carry out the operation in block 522, and the determining unit 822 may be operable to carry out the operation in block 524. Optionally, the receiving unit 821 and/or the determining unit 822 may be operable to carry out more or less operations to implement the proposed methods according to the exemplary embodiments of the present disclosure.

Figure 9:
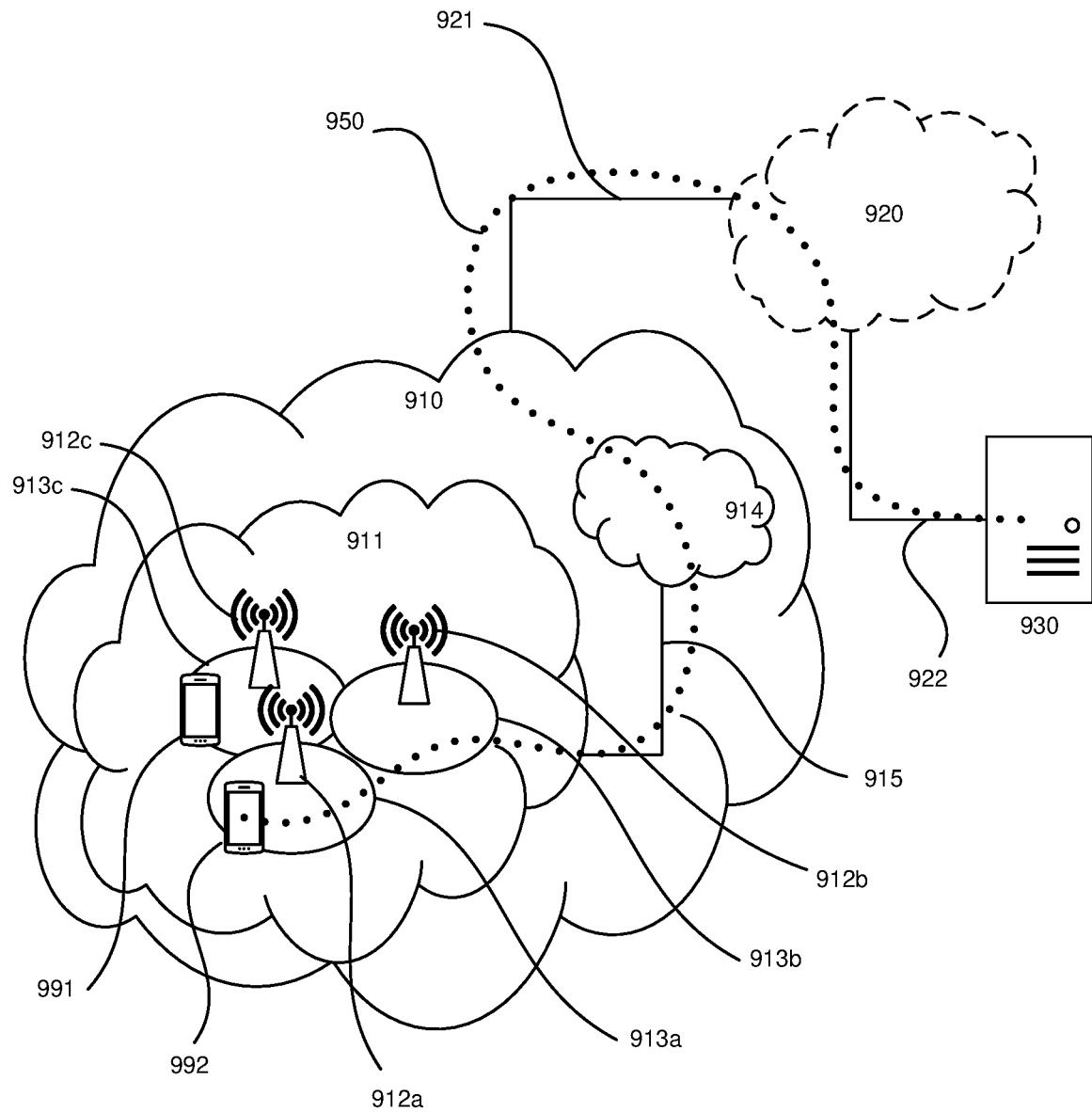
FIG. 9 is a block diagram illustrating a telecommunication network connected via an intermediate network to a host computer in accordance with some embodiments of the present disclosure.

FIG. 9 is a block diagram illustrating a telecommunication network connected via an intermediate network to a host computer in accordance with some embodiments of the present disclosure.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in a coverage area 913c is configured to wirelessly connect to, or be paged by, the corresponding base station 912c. A second UE 992 in a coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. Connections 921 and 922 between the telecommunication network 910 and the host computer 930 may extend directly from the core network 914 to the host computer 930 or may go via an optional intermediate network 920. An intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, the base station 912 may not or need not be informed about the past routing of an incoming downlink communication with data originating from the host computer 930 to be forwarded (e.g., handed over) to a connected UE 991. Similarly, the base station 912 need not be aware of the future routing of an outgoing uplink communication originating from the UE 991 towards the host computer 930.

Figure 10:
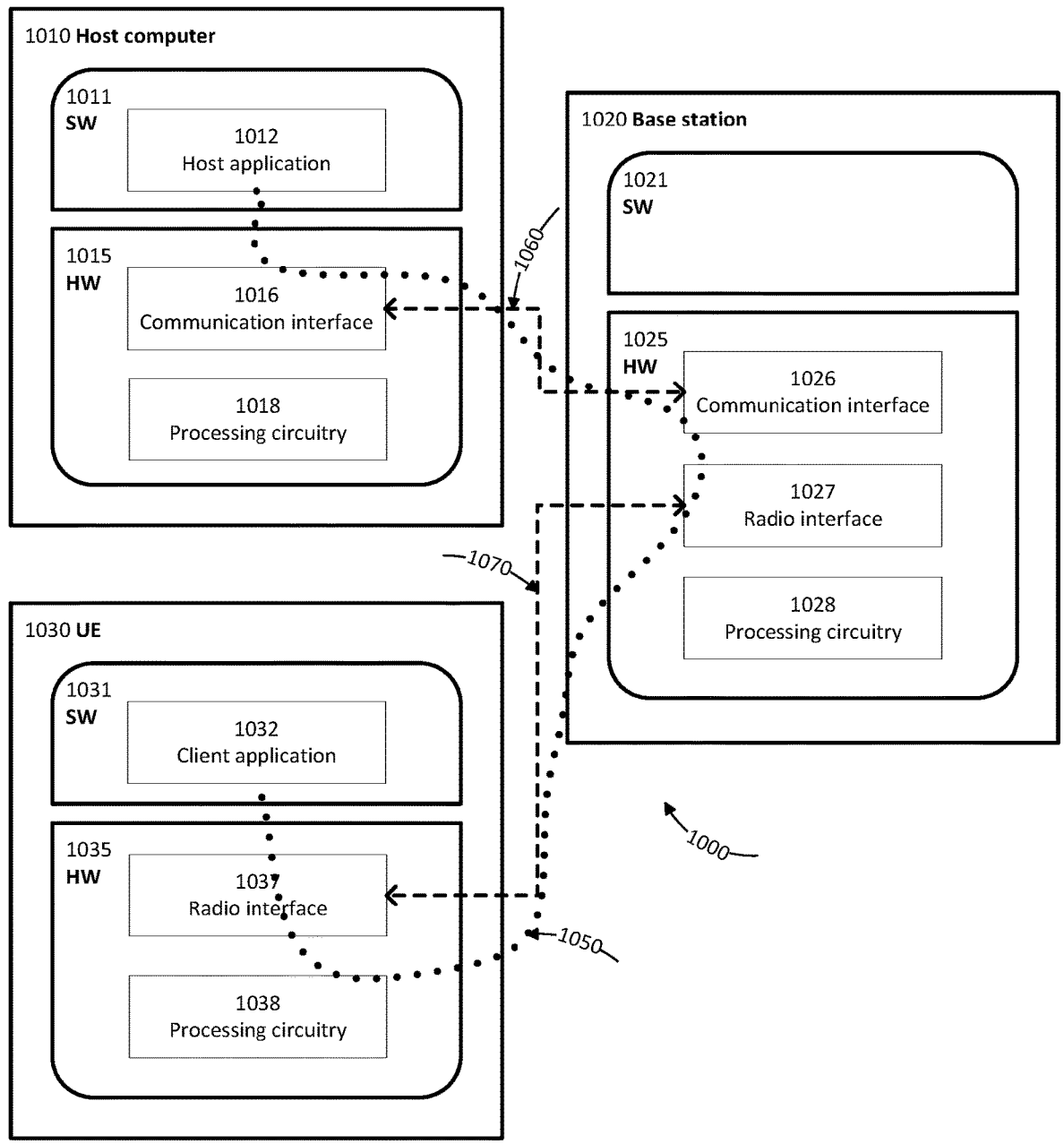
FIG. 10 is a block diagram illustrating a host computer communicating via a base station with a UE over a partially wireless connection in accordance with some embodiments of the present disclosure.

FIG. 10 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises a processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with the UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes a processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes a processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

It is noted that the host computer 1010, the base station 1020 and the UE 1030 illustrated in FIG. 10 may be similar or identical to the host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

Wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1050 between the host computer 1010 and the UE 1030, in response to variations in the measurement results. The measurement procedure and/or the network functionality for reconfiguring the OTT connection 1050 may be implemented in software 1011 and hardware 1015 of the host computer 1010 or in software 1031 and hardware 1035 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which the software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer 1010's measurements of throughput, propagation times, latency and the like. The measurements may be implemented in that the software 1011 and 1031 causes messages to be transmitted, in particular empty or 'dummy' messages, using the OTT connection 1050 while it monitors propagation times, errors etc.

Figure 11:
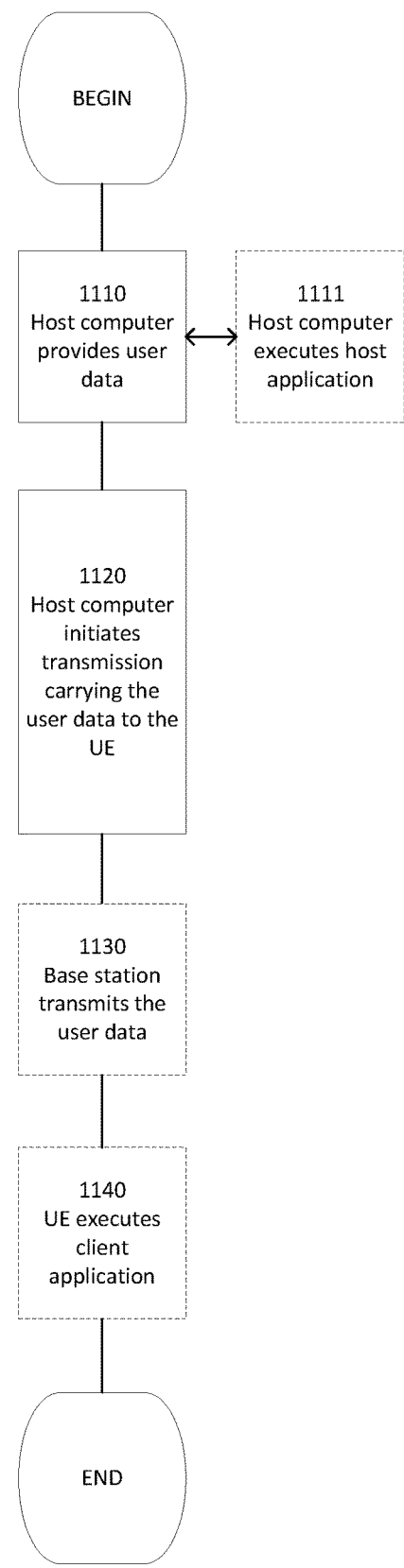
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 11 will be included in this section. In step 1110, the host computer provides user data. In sub step 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
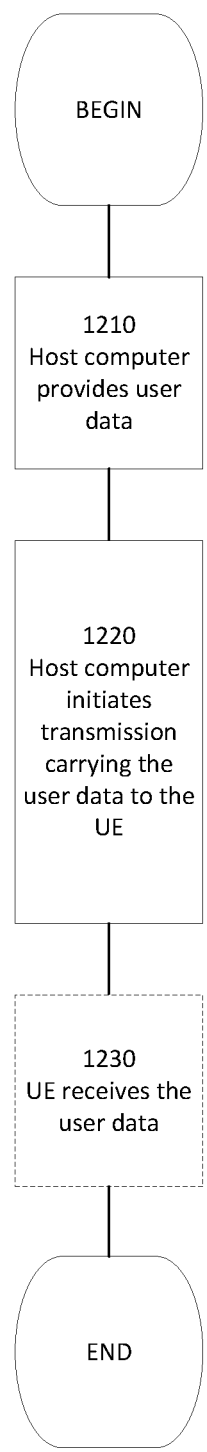
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
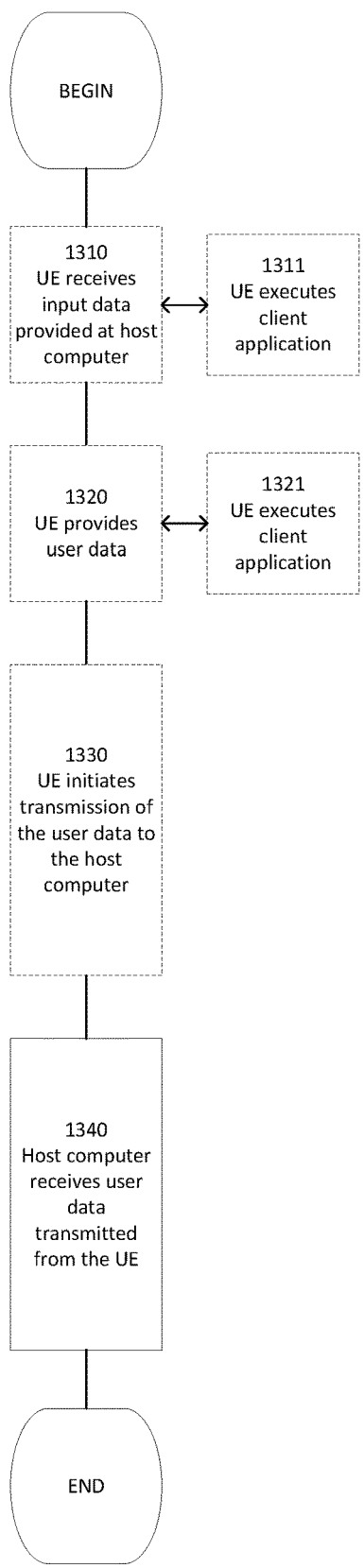
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
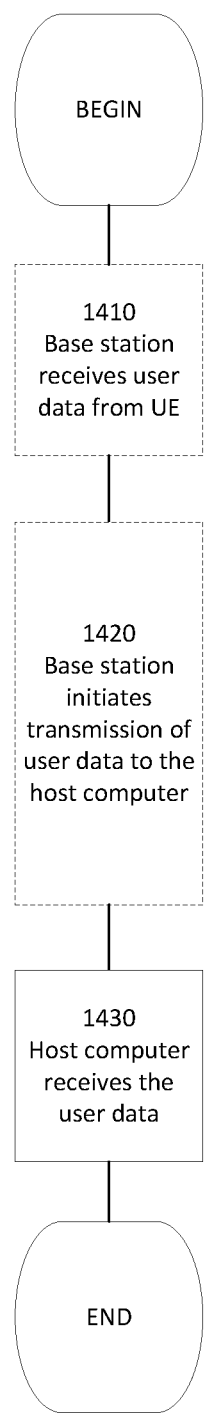
FIG. 14 is a flowchart illustrating a method implemented in a communication system, in accordance with an embodiment of the present disclosure.

FIG. 14 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a network such as NTN comprising the base station which may perform any step of the exemplary method 420 as describe with respect to FIG. 4B or any step of the exemplary method 520 as describe with respect to FIG. 5B.

According to some exemplary embodiments, there is provided a communication system including a host computer. The host computer may comprise processing circuitry configured to provide user data, and a communication interface configured to forward the user data to a network such as NTN for transmission to a UE. The network such as NTN may comprise a base station having a radio interface and processing circuitry. The base station's processing circuitry may be configured to perform any step of the exemplary method 420 as describe with respect to FIG. 4B or any step of the exemplary method 520 as describe with respect to FIG. 5B.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a network such as NTN comprising the base station. The UE may perform any step of the exemplary method 410 as describe with respect to FIG. 4A or any step of the exemplary method 510 as describe with respect to FIG. 5A.

According to some exemplary embodiments, there is provided a communication system including a host computer. The host computer may comprise processing circuitry configured to provide user data, and a communication interface configured to forward user data to a network such as NTN for transmission to a UE. The UE may comprise a radio interface and processing circuitry. The UE's processing circuitry may be configured to perform any step of the exemplary method 410 as describe with respect to FIG. 4A or any step of the exemplary method 510 as describe with respect to FIG. 5A.

According to some exemplary embodiments, there is provided a method implemented in a communication system which may include a host computer, a base station and a UE. The method may comprise, at the host computer, receiving user data transmitted to the base station from the UE which may perform any step of the exemplary method 410 as describe with respect to FIG. 4A or any step of the exemplary method 510 as describe with respect to FIG. 5A.

According to some exemplary embodiments, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the exemplary method 410 as describe with respect to FIG. 4A or any step of the exemplary method 510 as describe with respect to FIG. 5A.

According to some exemplary embodiments, there is provided a method implemented in a communication system which may include a host computer, a base station and a UE. The method may comprise, at the host computer, receiving, from the base station, user data originating from a transmission which the base station has received from the UE. The base station may perform any step of the exemplary method 420 as describe with respect to FIG. 4B or any step of the exemplary method 520 as describe with respect to FIG. 5B.

According to some exemplary embodiments, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the exemplary method 420 as describe with respect to FIG. 4B or any step of the exemplary method 520 as describe with respect to FIG. 5B.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a terminal device, the method comprising:
   determining a random access occasion based at least in part on random access configuration information for a non-terrestrial network; and
   transmitting a preamble to a network node in the non-terrestrial network, according to the determined random access occasion, wherein the random access configuration information indicates configuration of two consecutive random access occasions so that a time interval between the two consecutive random access occasions is equal to or larger than an interval threshold.

2. The method according to claim 1, wherein the interval threshold is determined based at least in part on a maximum one way delay and a minimum one way delay of signal transmission in the non-terrestrial network.

3. The method according to claim 1, wherein the random access configuration information indicates configuration of two consecutive random access occasions so that two preamble receiving windows associated with the two consecutive random access occasions are not overlapped.

4. The method according to claim 1, wherein the random access configuration information indicates a first set of random access occasions configured for the non-terrestrial network in a predetermined time duration, and wherein the first set of random access occasions is a subset of a second set of random access occasions configured for a terrestrial network in the predetermined time duration.

5. The method according to claim 4, wherein the random access configuration information comprises a first bit map mask to indicate one or more subframes within one or more system frames, and wherein the first set of random access occasions for the non-terrestrial network are configured on the one or more subframes.

6. The method according to claim 5, wherein the random access configuration information comprises a second bit map mask to invalidate one or more of a second set of random access occasions configured for a terrestrial network in a predetermined time duration, so that only a subset of the second set of random access occasions in the predetermined time duration are valid for the non-terrestrial network.

7. The method according to claim 1, wherein the random access configuration information indicates a random access configuration period, and a length of the random access configuration period meets a specific criterion for the non-terrestrial network.

8. The method according to claim 7, wherein the random access configuration information comprises an offset to a random access configuration period for a terrestrial network to indicate the random access configuration period for the non-terrestrial network.

9. The method according to claim 1, wherein the random access configuration information is received from the network node by the terminal device.

10. The method according to claim 1, wherein the random access configuration information is predetermined for the non-terrestrial network separately from a terrestrial network.

11. The method according to claim 1, wherein the random access configuration information comprises at least one of:
- a random access configuration period for the non-terrestrial network in number of system frames; and
- an indicator of a subframe on which a random access occasion for the non-terrestrial network is configured.

12. The method according to claim 1, wherein the random access configuration information is applicable to at least one of a four-step random access procedure and a two-step random access procedure.

13. A method performed by a network node, the method comprising:
- determining a preamble receiving window based at least in part on random access configuration information for a non-terrestrial network; and
- receiving, within the preamble receiving window, a preamble transmitted from a terminal device in the non-terrestrial network, wherein the random access configuration information indicates configuration of two consecutive random access occasions so that a time interval between the two consecutive random access occasions is equal to or larger than an interval threshold.

14. The method according to claim 13, wherein the interval threshold is determined based at least in part on a maximum one way delay and a minimum one way delay of signal transmission in the non-terrestrial network.

15. The method according to claim 13, wherein the random access configuration information indicates configuration of two consecutive random access occasions so that two preamble receiving windows associated with the two consecutive random access occasions are not overlapped.

16. The method according to claim 13, wherein the random access configuration information indicates a first set of random access occasions configured for the non-terrestrial network in a predetermined time duration, and wherein the first set of random access occasions is a subset of a second set of random access occasions configured for a terrestrial network in the predetermined time duration.

17. The method according to claim 16, wherein the random access configuration information comprises a first bit map mask to indicate one or more subframes within one or more system frames, and wherein the first set of random access occasions for the non-terrestrial network are configured on the one or more subframes.

18. A terminal device, comprising:
- one or more processors; and
- one or more memories comprising computer program codes,
- the one or more memories and the computer program codes configured to, with the one or more processors, cause the terminal device at least to:
- determine a random access occasion based at least in part on random access configuration information for a non-terrestrial network; and
- transmit a preamble to a network node in the non-terrestrial network, according to the determined random access occasion, wherein the random access configuration information indicates configuration of two consecutive random access occasions so that a time interval between the two consecutive random access occasions is equal to or larger than an interval threshold.

* * * * *